US007611409B2

(12) United States Patent
Muir et al.

(10) Patent No.: US 7,611,409 B2
(45) **Date of Patent: *Nov. 3, 2009**

(54) METHOD AND APPARATUS FOR REGISTERING A MOBILE DEVICE WITH A GAMING MACHINE

(75) Inventors: David Hugh Muir, Newcastle (AU); Binh T. Nguyen, Reno, NV (US)

(73) Assignee: IGT, Reno, NV (US)

( * ) Notice: Subject to any disclaimer, the term of this patent is extended or adjusted under 35 U.S.C. 154(b) by 210 days.

This patent is subject to a terminal disclaimer.

(21) Appl. No.: 11/313,223

(22) Filed: Dec. 19, 2005

(65) Prior Publication Data

US 2006/0189382 A1 Aug. 24, 2006

Related U.S. Application Data

(63) Continuation-in-part of application No. 11/064,168, filed on Feb. 22, 2005, which is a continuation-in-part of application No. 09/957,742, filed on Sep. 20, 2001, now Pat. No. 6,896,618.

(51) Int. Cl.
*G06F 19/00* (2006.01)

(52) U.S. Cl. ............................ 463/29; 463/24; 463/25; 463/42; 273/138.1; 273/139; 709/203; 713/170

(58) Field of Classification Search ............ 463/16–23, 463/25–29, 30–33, 39–43, 45, 47; 273/138.1, 273/139, 138.2, 141 A, 454–456, 460; 709/203–207; 713/1, 100, 150, 182, 187–189, 300, 375, 713/400, 500, 600

See application file for complete search history.

(56) References Cited

U.S. PATENT DOCUMENTS 3,662,105 A 5/1972 Hurst et al.
4,071,689 A 1/1978 Talmage et al.
4,072,930 A 2/1978 Lucero et al.
4,283,709 A 8/1981 Lucero et al.
4,339,709 A 7/1982 Brihier et al.

(Continued)

FOREIGN PATENT DOCUMENTS

AU 704691 4/1997

(Continued)

OTHER PUBLICATIONS

Miguel Bravo-Escos, "Networking gets personal," IEE Review Jan. 2002, pp. 32-36.

(Continued)

*Primary Examiner*—Peter DungBa Vo
*Assistant Examiner*—Arthur O. Hall
(74) *Attorney, Agent, or Firm*—Weaver Austin Villeneuve & Sampson LLP

(57) ABSTRACT

Disclosed are methods, apparatus, and systems, including computer program products, implementing techniques for securing a gaming machine for a player of the gaming machine using a mobile device such as a cell phone associated with the player. A player input requests securing of the gaming machine. Responsive to the player input, an access code and a security code are retrieved. The access code defines an access point of a communication system. The security code is specific to a game play session for the player at the gaming machine. The retrieved access code and security code are provided for the player. When the mobile device accesses the communications system and submits the security code, a secure signal is sent to the gaming machine, instructing the gaming machine to enter a remote game play state. The gaming machine can be released from the remote game play state responsive to a releasing event. In one implementation, a wireless interface enables communication between the mobile device and gaming machine according to a wireless protocol such as Bluetooth.

22 Claims, 11 Drawing Sheets

U.S. PATENT DOCUMENTS 4,339,798 A * 7/1982 Hedges et al. ................ 463/26
4,553,222 A 11/1985 Kurland et al.
4,856,787 A 8/1989 Itkis
5,038,022 A * 8/1991 Lucero ........................ 463/25
5,042,809 A 8/1991 Richardson
5,048,831 A 9/1991 Sides
5,179,517 A * 1/1993 Sarbin et al. .................. 463/25
5,371,345 A 12/1994 LeStrange et al.
5,429,361 A 7/1995 Raven et al.
5,470,079 A 11/1995 LeStrange et al.
5,618,045 A 4/1997 Kagan et al.
5,643,086 A 7/1997 Alcorn et al.
5,655,961 A 8/1997 Acres et al.
5,702,304 A 12/1997 Acres et al.
5,718,632 A 2/1998 Hayashi
5,741,183 A 4/1998 Acres et al.
5,759,102 A 6/1998 Pease et al.
5,761,647 A 6/1998 Boushy
5,768,382 A 6/1998 Schneier et al.
5,769,716 A 6/1998 Saffari et al.
5,770,533 A 6/1998 Franchi
5,779,545 A 7/1998 Berg et al.
5,788,573 A 8/1998 Baerlocher et al.
5,795,228 A 8/1998 Trumbull et al.
5,796,389 A 8/1998 Bertram et al.
5,797,085 A 8/1998 Beuk et al.
5,809,482 A 9/1998 Strisower
5,811,772 A 9/1998 Lucero
5,816,918 A 10/1998 Kelly et al.
5,833,536 A 11/1998 Davids et al.
5,833,540 A * 11/1998 Miodunski et al. ............ 463/42
5,851,148 A 12/1998 Brune et al.
5,871,398 A 2/1999 Schneier et al.
D406,612 S 3/1999 Johnson
5,885,158 A 3/1999 Torango et al.
5,919,091 A 7/1999 Bell et al.
5,951,397 A 9/1999 Dickinson
5,954,583 A 9/1999 Green
5,957,776 A 9/1999 Hoehne
5,967,896 A 10/1999 Jorasch et al.
5,971,271 A 10/1999 Wynn et al.
5,984,779 A 11/1999 Bridgeman et al.
5,999,808 A * 12/1999 LaDue .................... 455/412.2
6,001,016 A * 12/1999 Walker et al. ................. 463/42
6,003,013 A 12/1999 Boushy et al.
6,003,651 A 12/1999 Waller et al.
6,010,404 A * 1/2000 Walker et al. ................. 463/21
6,012,832 A 1/2000 Saunders et al.
6,012,983 A * 1/2000 Walker et al. ................. 463/20
6,038,666 A * 3/2000 Hsu et al. ................... 713/186
6,048,269 A 4/2000 Burns et al.
6,050,895 A 4/2000 Luciano, Jr. et al.
6,062,981 A 5/2000 Luciano, Jr.
6,068,552 A 5/2000 Walker et al.
6,077,163 A 6/2000 Walker et al.
6,089,975 A 7/2000 Dunn
6,099,408 A 8/2000 Schneier et al.
6,104,815 A 8/2000 Alcorn et al.
6,106,396 A 8/2000 Alcorn et al.
6,110,041 A 8/2000 Walker et al.
6,113,492 A 9/2000 Walker et al.
6,113,493 A 9/2000 Walker et al.
6,113,495 A 9/2000 Walker et al.
6,135,884 A 10/2000 Hedrick et al.
6,135,887 A * 10/2000 Pease et al. ................... 463/42
6,139,431 A 10/2000 Walker et al.
6,149,522 A 11/2000 Alcorn et al.
6,161,059 A 12/2000 Tedesco et al.
6,162,121 A 12/2000 Morro et al.
6,162,122 A 12/2000 Acres et al.
6,174,234 B1 1/2001 Seibert et al.
6,182,221 B1 * 1/2001 Hsu et al. ................... 713/186
6,183,362 B1 2/2001 Boushy
6,190,256 B1 2/2001 Walker et al.
6,210,279 B1 4/2001 Dickinson
6,227,972 B1 5/2001 Walker et al.
6,244,958 B1 6/2001 Acres
6,247,643 B1 6/2001 Lucero
6,253,119 B1 6/2001 Dabrowski
6,264,560 B1 7/2001 Goldberg et al.
6,264,561 B1 * 7/2001 Saffari et al. .................. 463/42
6,267,671 B1 7/2001 Hogan
6,270,410 B1 8/2001 DeMar et al.
6,280,328 B1 8/2001 Holch et al.
6,285,868 B1 * 9/2001 LaDue ....................... 455/410
6,293,866 B1 9/2001 Walker et al.
6,302,790 B1 10/2001 Brossard
6,307,956 B1 10/2001 Black
6,319,125 B1 11/2001 Acres
6,341,353 B1 1/2002 Herman et al.
6,368,216 B1 4/2002 Hedricks et al.
6,371,852 B1 4/2002 Acres
6,379,246 B1 4/2002 Jabrowski
6,383,076 B1 5/2002 Tiedeken
6,409,595 B1 6/2002 Uihlein et al.
6,409,602 B1 6/2002 Wiltshire et al.
6,443,843 B1 9/2002 Walker et al.
6,450,885 B2 9/2002 Schneier et al.
6,488,585 B1 12/2002 Wells et al.
6,496,928 B1 * 12/2002 Deo et al. ................... 713/153
6,530,835 B1 3/2003 Walker et al.
6,561,903 B2 5/2003 Walker et al.
6,581,161 B1 * 6/2003 Byford ....................... 713/182
6,582,310 B1 6/2003 Walker et al.
6,628,939 B2 9/2003 Paulsen
6,676,522 B2 * 1/2004 Rowe et al. ................... 463/42
6,682,421 B1 * 1/2004 Rowe et al. ................... 463/25
6,685,567 B2 2/2004 Cockerille et al.
6,739,975 B2 * 5/2004 Nguyen et al. ................ 463/39
6,800,029 B2 * 10/2004 Rowe et al. ................... 463/25
6,846,238 B2 * 1/2005 Wells .......................... 463/39
6,880,079 B2 * 4/2005 Kefford et al. .............. 713/155
6,896,618 B2 * 5/2005 Benoy et al. .................. 463/25
7,275,991 B2 * 10/2007 Burns et al. ................... 463/25
7,337,330 B2 2/2008 Gatto et al.
7,477,889 B2 * 1/2009 Kim ........................... 455/411
7,510,474 B2 * 3/2009 Carter, Sr. .................... 463/29
7,552,341 B2 * 6/2009 Chen et al. .................. 713/187
2001/0039204 A1 * 11/2001 Tanskanen ................... 463/17
2001/0044337 A1 * 11/2001 Rowe et al. ................... 463/29
2002/0107066 A1 8/2002 Seelig et al.
2002/0147047 A1 * 10/2002 Letovsky et al. .............. 463/42
2002/0147049 A1 * 10/2002 Carter, Sr. .................... 463/42
2003/0003988 A1 1/2003 Walker et al.
2003/0032485 A1 * 2/2003 Cockerille et al. ............ 463/43
2003/0054881 A1 * 3/2003 Hedrick et al. ................ 463/29
2003/0083943 A1 5/2003 Adams et al.
2003/0148812 A1 * 8/2003 Paulsen et al. ................ 463/42
2003/0203756 A1 * 10/2003 Jackson ....................... 463/42
2004/0106454 A1 6/2004 Walker et al.
2004/0127277 A1 * 7/2004 Walker et al. ................. 463/16
2004/0147314 A1 * 7/2004 LeMay et al. ................. 463/30
2004/0192434 A1 9/2004 Walker et al.
2004/0199284 A1 10/2004 Hara
2004/0225565 A1 11/2004 Selman
2004/0259640 A1 12/2004 Gentles et al.
2004/0266395 A1 * 12/2004 Pailles et al. ................ 455/411
2005/0076242 A1 4/2005 Breuer
2005/0130728 A1 * 6/2005 Nguyen et al. ................ 463/16
2006/0018450 A1 * 1/2006 Sandberg-Diment ..... 379/93.12
2006/0079333 A1 4/2006 Morrow et al.

2006/0165060 A1* 7/2006 Dua .......................... 370/352

FOREIGN PATENT DOCUMENTS

| | | | |
|---|---|---|---|
| DE | 10034275 | | 1/2002 |
| EP | 0744786 | A1 | 11/1996 |
| EP | 0 769 769 | | 4/1997 |
| EP | 0924657 | A2 | 6/1999 |
| EP | 1231577 | | 8/2002 |
| EP | 1494182 | | 5/2005 |
| GB | 2284913 | A | 6/1995 |
| WO | WO 95/24689 | | 9/1995 |
| WO | WO 96/00950 | | 1/1996 |
| WO | WO98/58509 | | 6/1997 |
| WO | WO 98/50876 | | 11/1998 |
| WO | WO01/00291 | A1 | 1/2001 |
| WO | WO01/01379 | A1 | 1/2001 |
| WO | WO01/03786 | A1 | 1/2001 |
| WO | WO01/48712 | A1 | 7/2001 |
| WO | WO01/76710 | A2 | 10/2001 |
| WO | WO 02/055163 | | 7/2002 |
| WO | WO03/019486 | | 3/2003 |
| WO | WO2004070591 | | 8/2004 |

OTHER PUBLICATIONS

Rae Saleem, "Preferred Payment Architecture: Local Payment," Mobey Forum-Mobile Financial Services Ltd., Sep. 2002, Document Version 1.0.

Rick Rowe et al., Cashless Transaction Clearinghouse, Nov. 16, 2001, U.S. Appl. No. 09/993,163.

Steven G. LeMay et al., Game Development Architecture that decouples the Game Logic from the Graphics Logic, Jan. 1, 2002, U.S. Appl. No. 10/040,239.

Binh T. Nguyen et al., Secured Virtual Network in a Gaming Environment, Apr. 3, 2002, U.S. Appl. No. 10/116,424.

Joseph R. Hedrick et al., Player Tracking Communication Mechanisms in a Gaming Machine, Sep. 16, 2002. U.S. Appl. No. 10/246,373.

William R. Brosnan et al., Identifying Message Senders, Nov. 7, 2002, U.S. Appl. No. 10/291,926.

Rex Y. Lam, et al. Usb Software Architecture In A Gaming Machine, Jun. 11, 2003, U.S. Appl. No. 10/460,822.

Robert Silva et al., Wireless Input/Output and Peripheral Devices on a Gaming Machine, Sep. 11, 2003, U.S. Appl. No. 10/661,404.

The definition of graphical, The American Heritage Dictionary of the English Language, Third Edition, copyright 1992 by Houghton Mifflin Company.

Paul Yao, Microsoft Windows CE 2.0: It's Not Just for Handheld PCs Any More—MSJ, May 1998; www.microsoft.com/msj/0598/wince.aspx (pp. 1-23).

Mark Fischetti, Touch Screens: At Your Fingertips, Scientific American, Apr. 2001 (pp. 102-103).

Dan Bricklin, About Tablet Computing Old and New, Nov. 22, 2002; http://www.bricklin.com/tabletcomputing.htm (pp. 1-7).

Defendant's Invalidity Contentions in Litigation Proceedings: *IGT* vs. *Bally's* District of Nevada Case No. CV-S-04-1676-RCJ-(RJJ) (194 pages).

European Office Action dated Jan. 12, 2007 in related EP Application No. 02773484.7.

International Search Report and Written Opinion dated Aug. 14, 2007 for PCT/US2006/047839.

US Office Action dated Jan. 11, 2008 issued in U.S. Appl. No. 11/515,244 (IGT1P179C1).

US Final Office Action dated Sep. 15, 2008 issued in U.S. Appl. No. 11/515,244 (IGT1O179C1).

US Office Action dated Feb. 27, 2009 issued in U.S. Appl. No. 11/515,244 (IGT1P179C1).

* cited by examiner

METHOD AND APPARATUS FOR REGISTERING A MOBILE DEVICE WITH A GAMING MACHINE

REFERENCE TO EARLIER-FILED APPLICATION

This application claims priority and is a continuation-in-part of and commonly assigned U.S. patent application Ser. No. 11/064,168, by Nguyen et al., filed Feb. 22, 2005, for GAMING SYSTEM AND GAMING METHOD, which is a continuation-in-part of application Ser. No. 09/957,742 filed Sep. 20, 2001 now U.S. Pat. No. 6,896,618, by Benoy et al., for POINT OF PLAY REGISTRATION ON A GAMING MACHINE, both of which are hereby incorporated by reference.

BACKGROUND OF THE INVENTION

The present disclosure relates to gaming machines and networks and, more particularly, associating mobile devices with gaming machines and networks.

Gaming in the United States is divided into Class I, Class II and Class III games. Class I gaming includes social games played for minimal prizes, or traditional ceremonial games. Class II gaming includes bingo games, pull tab games if played in the same location as bingo games, lotto, punch boards, tip jars, instant bingo, and other games similar to bingo. Class III gaming includes any game that is not a Class I or Class II game, such as a game of chance typically offered in non-Indian, state-regulated casinos. Many games of chance that are played on gaming machines fall into the Class II and Class III categories of games.

As technology in the gaming industry progresses, the traditional mechanically driven reel slot machines are being replaced with electronic counterparts, that is, electronic gaming machines having video displays based on CRT, LCD or the like. Electronic gaming machines such as video slot machines and video poker machines are becoming increasingly popular. Part of the reason for their increased popularity is the nearly endless variety of games that can be implemented on a single gaming machine. Advancements in video/electronic gaming enable the operation of more complex games that would not otherwise be possible on mechanical-driven gaming machines or personal computers.

Various games, particularly the Class II and Class III categories of games, can be implemented as server-based games in a server-client system. In a server-based gaming arrangement, a gaming server serves multiple gaming machines as clients. For example, a casino can include a plurality of gaming machines located on the game floor, and a connected gaming server located in a back room of the casino. Generally, the games and capabilities of a gaming machine depend on the central server. The gaming machine may download games from the central server or may rely on the central server to run the games.

To enhance the gaming experience, there are devices that can be connected to a gaming machine such as a slot machine or video poker machine. Examples of these devices include player tracking units, lights, ticket printers, card readers, speakers, bill validators, ticket readers, coin acceptors, display panels, key pads, coin hoppers and button pads. These devices are built into the gaming machine or components attached to the gaming machine, for instance, a top box which is constructed on top of the gaming machine.

Typically, using a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, such as button pads and levers, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a player's attention to various game features and to heighten the player's interest in additional game play. Maintaining a game player's interest in game play, such as on a gaming machine or during other gaming activities, is an important consideration for an operator of a gaming establishment.

One method of gaining and maintaining a game player's interest in game play is a player tracking program offered at the gaming establishment. Player tracking programs provide rewards to players that typically correspond to the player's level of patronage, for example, to the player's playing frequency and/or total amount of game plays at a given casino. Player tracking rewards may be free meals, free lodging and/or free entertainment. These rewards may help to sustain a game player's interest in additional game play during a visit to a gaming establishment and may entice a player to visit a gaming establishment to partake in various gaming activities.

Currently, there is some desire by both game players and casino operators for additional incentives to sustain the player's interest in game play at a given gaming machine. Because a single machine can offer various games, there is less need for the player to change machines to play a different game. Moreover, on an emotional level, many players prefer to spend a gaming session, in which multiple games are played, on a single machine. After playing a single gaming machine for some length of time, the player feels comfortable with that machine. The player may consider the gaming machine "lucky" and/or believe the gaming machine is "due" for a win.

Game players feeling a special connection with a certain machine often prefer to maintain a game play session on the machine while performing an activity, such as getting a meal or going to a sports bar, which requires them to temporarily leave the machine. A game player may want to take a break but wish to continue playing a particular gaming machine because the player believes the machine is due for a win. Players often find themselves wishing they could reserve the gaming machine during the break to prevent other game players from playing the machine and spoiling their luck or winning the jackpot due on the gaming machine. However, casino operators are reluctant to provide a reservation service to players because, while a gaming machine is reserved, the machine does not generate revenue for the casino. Also, the time length of the reservation is unknown to the casino, and there is no guarantee the player will return.

Conventional gaming machines and systems do not offer the player the opportunity to suspend game play on the machine or otherwise reserve the gaming machine. To this end, there is a need for more flexible gaming sessions, including personal control and security of a gaming machine, for example, allowing a player to temporarily reserve and exert ownership of the machine. By the same token, there is a need to place certain limitations on such a reservation so the gaming machine can reasonably be used by other players and maintain some profitability for the casino. In addition, there is a need for more effective integration with player tracking, promotions, player service, and general provision of player convenience functions, such as location of specific devices and services.

SUMMARY OF THE INVENTION

Disclosed are methods, apparatus, and systems, including computer program products, implementing and using techniques for securing a gaming machine for a player of the gaming machine using a mobile device associated with the player.

In one aspect of the present invention, a player input is received at an interface of a gaming machine. The player input requests securing of the gaming machine for the player. Responsive to the player input, an access code and a security code are retrieved. The access code defines an access point of a communication system. The security code is specific to a game play session for the player at the gaming machine. The retrieved access code and security code are provided for the player. A confirmation message is received, indicating access of the communications system using the access code and receipt of the security code from the mobile device. Responsive to the confirmation message, the gaming machine is secured so that the gaming machine enters a remote game play state. The gaming machine can be released from the remote game play state responsive to a releasing event. In one implementation, the gaming machine interface is a wireless interface enabling communications according to a wireless protocol such as Bluetooth.

In another aspect of the present invention, a secure instruction is received from a gaming machine over a communications network. The secure instruction requests securing of the gaming machine for the player. Responsive to the secure instruction, an access code and a security code are retrieved and provided to the gaming machine. A communications session is established with the mobile device through an access point of the communications system. The security code can be received from the mobile device. In one implementation, the mobile device is sent a prompt signal for the security code. This prompt signal can be in the form of a voice message or a text message. A secure signal is sent to the gaming machine. The secure signal instructs the gaming machine to enter a remote game play state. In one implementation, during the remote game play state, status messages can be sent to the mobile device. Such status messages can be in text and audio format, indicating a time remaining before a time out condition is reached. Further, the status message can include information identifying a location of the gaming machine on a gaming environment floor.

In another aspect of the present invention, a gaming machine provides a game of chance for a player having an associated mobile device. The gaming machine includes a player interface coupled to receive a player input requesting securing of the gaming machine for the player. The gaming machine further includes a gaming controller including a processor configured to retrieve the access code and the security code. The retrieved access code and security code are provided for the player. The gaming machine further includes a network interface coupled to receive a confirmation message indicating access of the communication system using the access code, and receipt of the security code from the mobile device. The gaming controller is further configured to secure the gaming machine, responsive to the confirmation message, so that the gaming machine enters a remote game play state. The gaming controller is also configured to release the gaming machine from the remote game play state responsive to a releasing event.

In another aspect of the present invention, a data processing apparatus is capable of securing a gaming machine for the player. The apparatus includes a network interface coupled to receive a secure instruction from a gaming machine over the communications network. The secure instruction requests securing of the gaming machine for the player. The data processing apparatus further includes a processor configured to execute program code to retrieve an access code and a security code from a storage medium. The processor is further configured to establish a communication session with the mobile device through the access point of the communication system, receive the security code from the mobile device, and send a secure signal to the gaming machine. The secure signal instructs the gaming machine to enter a remote game play state.

In some aspects of the present invention, a remote game play session can be initiated. The remote game play session enables remote play of a game of chance on the gaming machine using the mobile device. In one embodiment, a secure session, initiated by a secure signal, is established with an approved gaming machine or device, allowing the player to essentially control, receive and view any game play state information via the mobile device. For example, game outcomes can be sent from the gaming machine to the mobile device. The game outcomes can be sent in a substantially real-time manner, or can be delayed, depending on the desired implementation. In addition, fund transfer operations can be enabled using the mobile device. In some embodiments, essentially all possible control mechanisms appropriate to the mobile device and available on the gaming machine are remotely available, including customer services, attendant requests and the like.

All of the foregoing methods and apparatus, along with other methods and apparatus of aspects of the present invention, may be implemented in software, firmware, hardware and combinations thereof. For example, the methods of aspects of the present invention may be implemented by computer programs embodied in machine-readable media and other products.

Aspects of the invention may be implemented by networked gaming machines, game servers and other such devices. These and other features and benefits of aspects of the invention will be described in more detail below with reference to the associated drawings.

DETAILED DESCRIPTION OF THE EMBODIMENTS

Figure 1:
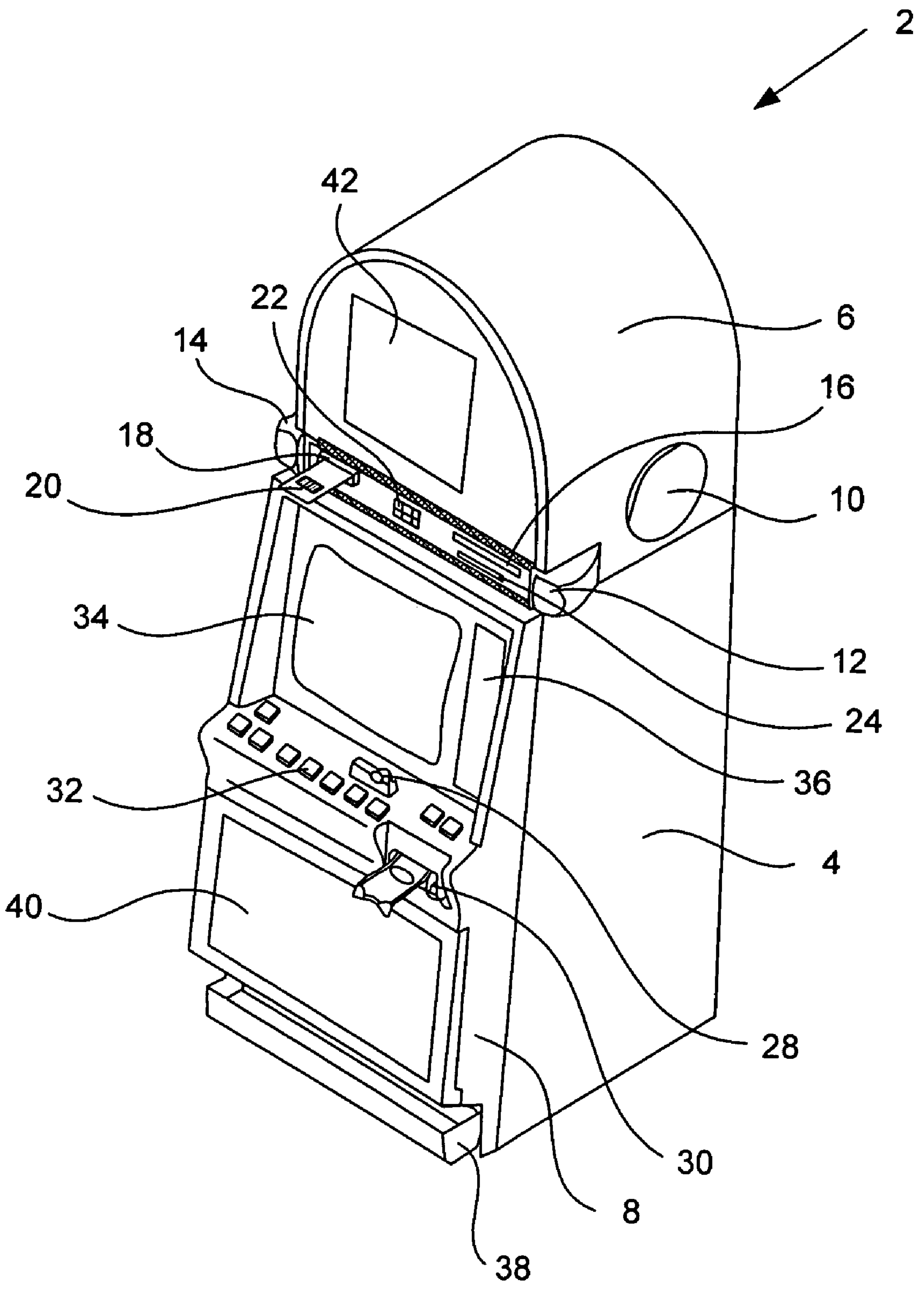
FIG. 1 shows a diagram of a video gaming machine constructed according to one embodiment of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known operations and components have not been described in detail in order not to obscure the present invention.

Embodiments of the invention provide for a mobile device such as a handheld portable device to be registered or otherwise associated with a gaming machine in a gaming environment. Associating the mobile device with the gaming machine allows the player to use the mobile device as a personal security tool in the gaming venue. For example, a player associated with the mobile device can use the mobile device to secure the gaming machine so that game play on the gaming machine is reserved for the player. Securing the machine in this manner can be desirable when the player wishes to temporarily leave the machine and move to a different location in the venue or at another venue. Examples of gaming venues in which embodiments of the invention can be practiced include casinos, hotels, airports and other environments having gaming machines.

When the mobile device is associated with the gaming machine, a remote game play session can be established. That is, the player can continue to play games of chance on the gaming machine using the mobile device to remotely interact with the gaming machine. In one embodiment, game outcomes from the gaming machine are sent to the mobile device for remote play. Game outcomes can be sent from the machine to the mobile device in a substantially real-time manner, that is, as the outcomes are received at the gaming machine. Such real-time distribution of game outcomes from the machine to the mobile device is referred to herein as "spontaneous" game play on the mobile device. In another embodiment, game outcomes are output on the mobile device in a time-shifted manner. For example, generated outcomes can be stored in a memory device within the gaming machine or within the mobile device after download for some period of time. Later, the stored outcomes are retrieved and output on the mobile device, for instance, when the player is ready to resume game play after taking a break.

Embodiments of the invention provide for additional actions when the mobile device secures or is otherwise associated with the gaming machine. For instance, the player can use the mobile device as a purchase tool to buy additional outcomes for download to the mobile device. The player can use the mobile device to access an account, such as a bank account, or player account with the casino, and transfer funds and/or credits to the gaming machine. Depending on the desired implementation, the mobile device can send an instruction message to a server controlling the account to perform the fund transfer. In some embodiments, the funds or credits can be transferred from the financial account to the gaming machine through an intermediary device such as a central server, or even the mobile device itself. Such additional actions facilitate continued game play on the mobile device.

Embodiments of the present invention often incorporate data processing apparatus including gaming machines, gaming servers such as backend servers and central control servers, and other communications apparatus associated with gaming networks, telephone networks, and mobile communications systems and networks. For example, a backend server that serves a number of gaming machines at a gaming venue can interface with a central phone system in communication with a wireless cellular network. A player holding a mobile device can access one or more of the apparatus through a wireless access point of the cellular network.

A mobile device used in accordance with embodiments of the invention can be a handheld portable communications device such as a mobile phone, a personal digital assistant ("PDA") having wireless communications capabilities, such as the BlackBenry® 7520 Wireless Handheld, manufactured by Research in Motion, Ltd., or other devices having communications capabilities such as a laptop computer. Various wireless standards may be used with the present invention including but not limited to Bluetooth, IrDA (Infrared Direct Access), IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, and HomeRF. In some embodiments, methods and apparatus of the present invention are implemented in software that is downloaded to the mobile device and executed to enable the player to interact with apparatus in the gaming environment.

Commonly assigned U.S. Pat. No. 6,846,238, entitled "Wireless Game Player," by Wells, which is hereby incorporated by reference, describes mobile devices such as wireless game players which can interact with a gaming machine using wireless communications to play a game of chance. Those skilled in the art will appreciate that some or all of the components of the wireless game player described in U.S. Pat. No. 6,846,238, particularly the hardware and software enabling wired and wireless interaction with the gaming machine, can be incorporated in a mobile device constructed in accordance with embodiments of the present invention. Similarly, components of the gaming machine and game play system described in U.S. Pat. No. 6,846,238, particularly the hardware and software enabling wired and wireless interaction with the wireless game player, can be provided in gaming machines and systems constructed according to embodiments of the present invention.

Embodiments of the present invention allow for players wishing to secure a gaming machine to request a security code such as a digital signature and a phone access number. The player can dial the access number using the mobile device, establish a communications session with a gaming server, enter the code or a combination of codes, and initiate a transaction to secure the gaming machine. The gaming machine can generally be associated with the player (for instance, if the player is playing a large jackpot game). Various actions are also possible, such as locking the gaming machine until the player requests it to be released (e.g., by returning to the gaming machine or calling the access number and under prompt releasing it), releasing the lock after a timeout period, downloading game outcomes to the mobile device for continued game play, and transferring funds to the gaming machine. Also, the player can use the mobile device to enter into some promotional mode.

In one implementation, a dialog such as the following occurs:

1) The player requests the machine to provide the security code and access number.

2) The player calls the access number using the mobile device, and a call is initiated with a gaming server.

3) When the call is active, a voice prompt from the gaming server and/or phone system requests the digital signature as a security code.

4) The gaming server may also request the player's name or some verbal code for additional security.

5) The player enters the requested information by voice or manual entry using the mobile device.

6) The call is confirmed and terminated.

7) The entered information is sent to a central server which records the information and sets various codes and control flags.

8) The gaming server sends the gaming machine the various codes, such as lock commands.

9) The action of locking the gaming machine is visually acknowledged on a display of the gaming machine.

Other alternative and additional dialogs are provided within the scope of the present invention.

In some embodiments, the gaming machine is locked for credit security reasons until the player returns. In some embodiments, after the passing of a period of time or other event, the backend server initiates communications with the mobile device. A voice message, text message, email, or combination is sent to the mobile device to remind the player that the machine is still locked. In one embodiment, the message includes a warning that the exclusive lock will be automatically removed after a certain time, and that credits will be transferred to a holding station or kiosk for redemption. In an alternative embodiment, credits are transferred to the holding station at the beginning of the lockdown. The automatic expiration of the lock and credit transfer address several concerns including other players taking over the machine when the player does not return, machines being idle due to residual credits left by the player, dispute resolution, and added security for the player in terms of credits in machine.

Embodiments of the present invention provide more secure and flexible gaming sessions, and provide the player with a higher level of control and integration with the machine. In some embodiments, methods and apparatus of the present invention provide the feature of proof of play or machine ownership (e.g., for ticketing or large jackpots). Embodiments of the present invention can also provide player tracking and promotion functions as an alternative to player tracking cards, and/or can easily integrate with existing player tracking and promotions systems. Embodiments of the present invention enable players to select, via a backend server, various options on the machine, including configuration parameters for configuring the machine. Also, embodiments of the present invention enable the gaming venue to establish communications with the player, provide new customer services, help lines, and other features to enhance the gaming experience. An additional feature is that dispute resolution and win security is optimized.

Turning first to FIG. 1, a video gaming machine 2 constructed according to one embodiment of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. a master gaming controller) housed inside the main cabinet 4 of the machine 2.

In FIG. 1, the information panel 36 may be used as an interface to provide player tracking services and other game services to a player playing a game on the gaming machine 2. The information panel 36 may be used as an interface by a player to: 1) input player tracking identification information, 2) view account information and perform account transactions for accounts such as player tracking accounts and bank accounts, 3) receive operating instructions, 4) redeem prizes or comps including using player tracking points to redeem the prize or comp, 5) make entertainment service reservations, 6) transfer credits to cashless instruments and other player accounts, 7) participate in casino promotions, 8) select entertainment choices for output via video and audio output mechanisms, 9) play games and bonus games, 10) request gaming services such as a drink orders, 11) communicate with other players or casino service personnel and 12) register a player for a loyalty program such as a player tracking program. In addition, the information panel 36 may be used as an interface by casino service personnel to: a) access diagnostic menus, b) display player tracking unit status information and gaming machine status information, c) access gaming machine metering information and d) display player status information.

Many different types of games, including mechanical slot games, video slot games, video poker, video black jack, video pachinko and lottery, may be provided on gaming machine 2. The gaming machine 2 is operable to provide play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may execute game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

In FIG. 1, the gaming machine 2 includes a top box 6 which sits on top of the main cabinet 4. The top box 6 houses a number of devices which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. The top box 6 may house various devices. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming devices on which the present invention may be implemented. For example, not all suitable gaming machines have top boxes or player tracking features. Further, some gaming machines have only a single game display—mechanical or video—while others are designed for bar tables and have displays that face upwards. As another example, a game may be generated on a host computer and may be displayed on a remote terminal or a remote gaming device. The remote gaming device may be connected to the host computer via a network of some type such as a local area network, a wide area network, an intranet or the Internet, by a wired or wireless connection. The remote gaming device may be a portable gaming device such as but not limited to a cell phone, a personal digital assistant, and a wireless game player. Images rendered from 3-D gaming environments may be displayed on portable gaming devices that are used to play a game of chance. Further, a gaming machine or server may include gaming logic for commanding a remote gaming device to render an image from a virtual camera in a 3-D gaming environment stored on the remote gaming device and to display the rendered image on a display located on the remote gaming device. Thus, those of skill in the art will understand that the present invention, as described below, can be deployed on most any gaming machine now available or hereafter developed.

Some preferred IGT gaming machines are implemented with special features and/or additional circuitry that differentiates them from general-purpose computers (e.g., desktop personal computers and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements, and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. This requirement affects the software and hardware design on a gaming machine. As anyone who has used a PC knows, PCs are not state machines and a majority of data is usually lost when such a malfunction occurs.

A second important difference between gaming machines and common PC based computer systems is that for regulation purposes, the software on the gaming machine used to generate the game of chance and operate the gaming machine has been designed to be static and monolithic to prevent cheating by the operator of the gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burned, approved by the gaming jurisdiction and installed on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and in some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally, in the gaming industry, gaming machines have been relatively simple in the sense that the number of peripheral devices and the number of functions of the gaming machine have been limited. Further, in operation, the functionality of gaming machines were relatively constant once the gaming machine was deployed, i.e., new peripherals devices and new gaming software were infrequently added to the gaming machine. This differs from a PC where users will buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators, ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the gaming machine circuitry. These can be generated in a central power supply or locally on the circuit board. If any of these voltages falls out of the tolerance limits of the circuitry they power, unpredictable operation of the gaming machine may result. Though most modern general-purpose computers include voltage monitoring circuitry, these types of circuits only report voltage status to the operating software. Out of tolerance voltages can cause software malfunction, creating a potential uncontrolled condition in the gaming computer. IGT gaming machines typically have power supplies with tighter voltage margins than that required by the operating circuitry. In addition, the voltage monitoring circuitry implemented in IGT gaming machines typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This ensures the player's wager and credits are preserved and minimizes potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc. that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at just prior to the malfunction including an indication of selections that have already been made by the player. In general, the gaming machine may be restored to any state in a plurality of states that occur in the game of chance while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," all of which are hereby incorporated by reference for all purposes.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents in a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. Some details related to trusted memory devices that may be used in the present invention are described in U.S. Pat. No. 6,685,567 from U.S. patent application Ser. No. 09/925,098, filed Aug. 8, 2001 and titled "Process Verification," which is hereby incorporated by reference in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the information panel 36 and video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one or more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

An important aspect of the present invention is game software licensing and game license management. When a gaming platform is capable of providing multiple games to a game player based upon a game selection made by the player or an operator, it may be desirable from both an operator perspective and a content provider perspective to provide capabilities for allowing more complex game licensing methods. The operator and content provider may use the licensing capabilities to enter into licensing agreements that better reflect the value of the content (e.g., game software) to each party. For instance, the licensing parties may agree to utility model based licensing schemes, such as a pay-per-use scheme. In a pay-per-use scheme, operators only pay for game software that is utilized by their patrons, protecting them from software titles that are "duds."

Game platforms exist that provide access to multiple electronic games. On these devices, a game selection menu may be provided on a video display, which offers the patron the choice of at least two electronic games. A game player may select a game of their choice from the games available on the gaming machine. Typically, the choices of games available to the player are only those licensed for play on the gaming platform. The gaming platform may provide a manual mechanism, such as a display interface on the gaming machine, for updating and renewing licensing on the gaming machine.

In some game platforms offering multiple games, the games are stored on read-only memory devices, such as an EPROM chip set or a CD-ROM. To provide a new or a different game on a gaming platform of this type, a technician, usually accompanied by a gaming regulator, must manually install a new memory device (e.g. EPROM) and then manually update the licensing configuration on the gaming machine. The gaming regulator then places evidence tape across the EPROM. The evidence tape is used to detect tampering between visits by the gaming regulator. Since operations performed by entities other than a "trusted" 3$^{rd}$ party, such as a gaming regulator, have been deemed untrustworthy, automatic game downloads and automatic licensing management is not available on these platforms.

The licensing of multiple games on a gaming machine is described in U.S. Pat. No. 6,264,561, titled "Electronic Gaming Licensing Apparatus and Method," assigned to IGT (Reno, Nev.), which is incorporated herein by reference in its entirety and for all purposes. In U.S. Pat. No. 6,264,561, multiple games may be stored on an EPROM. Typically, the EPROM may store up to 10 games. The method for getting a license to turn on 3 of 10 games consists of having an operator log onto the gaming machine, select the games to activate and obtain a request code for the selected games that allows them to be activated. Typically, the games are licensed for a limited time period. One disadvantage to this technique lies in the finite capacity of the storage device (EPROM in this case). While 5 or even 10 games can be stored on an EPROM, IGT's library of thousands of games cannot fit. Switching to higher capacity devices such as DVD will postpone the problem somewhat, but this device will be eventually saturated as well.

Other disadvantages are that the games are manually installed and activated. Thus, any changes or upgrades to the software on the gaming machine, such as adding a new game or fixing software on any of the games on the storage device involves replacing the entire storage device. As the number of games on the storage devices is increased and more games are made available on gaming platforms, it is likely that more frequent configuration changes on the gaming platform will be desired. As the number of configuration changes increases, it becomes more desirable to automate the configuration and licensing process.

One method to avoid swapping of the physical DVD, EPROM, etc., devices that store the game programs is to electronically download the necessary software into the gaming machine. Software download also allows a gaming machine to access scalable server farms and databases to select a set of games it needs from the game library. A desire of casino operators after games are safely downloaded is the ability to electronically move the games around on the casino floor. Casino managers routinely move slot machines (entire slot machine) around the floor in search of the optimum layout. A popular new game might be located near the door, but an older game might be better suited in the back. A Harley-Davidson™ game might be moved to the front during a biker convention, etc. Casinos often protect the arrangement of slot games as trade secrets. The laborious and costly casino floor rearrangement process needs to be expedited. When games can be electronically downloaded, they may also be electronically moved around the casino floor.

When a choice of games is offered, it complicates their distribution in part because every customer (purchaser of game software) may choose to license a unique combination of games. For example, one may choose Blackjack, Poker, and Keno while another chooses Poker, Twenty One, and Wheel of Fortune. One means to provide this would be to create a custom configuration of game software as requested by each customer. But, this "binary packaging" can be difficult and time consuming to manage especially in an envisioned environment where hundreds of new games may be introduced each year and distributed to thousands of slot machines on a typical casino floor. Another method of game licensing is to distribute all games to every customer and use an encryption technique that allows customers to 'unlock' only the games they are willing to buy, and install them only on the number of machines for which they have licenses. As described above, the activation is performed manually at the gaming machine. It is anticipated that it will be difficult to manage manually a game inventory mix in an environment where hundreds of new game titles may surface each year.

Manual activation schemes enforced with encryption present problems. Managers often change the selection and mix of games found in a given area of the casino because it can dramatically affect the amount of play and revenue. From the viewpoint of gaming operators, the overhead associated with manually activating encrypted games each time a game is added, deleted or transferred is a deterrent to providing gaming platform with multiple games. In addition, once the 'key' has been given to 'unlock' a particular game on one machine, it may be difficult to then revoke a key residing on a stand-alone machine. In a stand-alone machine, an operator must manually access the interior of the gaming machine and install software that revokes the key. Without the ability to 'lock' games once they have been 'unlocked,' multiple, unauthorized copies could operate simultaneously.

It is unacceptable to game content providers and gaming regulators to allow the use of unauthorized and untracked software on gaming platforms. To be properly compensated, game content providers want to know where and how much their software is being used. To ensure fairness, gaming regulators need to be able show that game software residing on a gaming machine is authentic and approved game software from an authorized content provider. In light of the above, methods that automate the game changeover process on gaming machine while providing an accurate record of the software transactions for auditing purposes and for use in utility licensing models are desirable.

In the past, a game license has been associated with the game software and the physical gaming machine that runs it. For example, the license may have been tied to a particular CPU or microprocessor on the gaming machine. In future gaming systems with gaming machines that are download enabled and contain multiple cells or cores that are capable of running multiple "virtual machines," it is anticipated that the game software and its license may no longer be associated with the gaming machine on which it is executed. In this environment, the game software may be allowed to "float" between various gaming devices and the physical device where the game software is executed becomes less relevant. For example, a casino floor could have 3000 gaming machines/game servers with the capability of generating 10,000 games of chance simultaneously where each gaming machine has the ability to remotely generate a game outcome on the other gaming machines or download game software to the other gaming machines. For the purposes of licensing, each instantiation of a game of chance may be viewed as a "virtual" gaming machine where each "virtual" gaming machine may be licensed individually. Thus, a license management system and methods are needed to manage game licenses for the 10,000 virtual gaming machines in a manner that meets the requirements of game regulators, casino operators, gaming machine manufacturers and game software content providers.

To implement gaming downloads for operator configuration purposes as well as game-on-demand for game players, the concerns and issues of many gaming interests, such as game players, casino operators, gaming regulators and game software providers, must be considered. The concerns and issues may include but are not limited to licensing requirements, regulatory requirements, network reliability and download time. Details of apparatus and methods designed to address these concerns are described with respect to the following figures.

Figure 2:
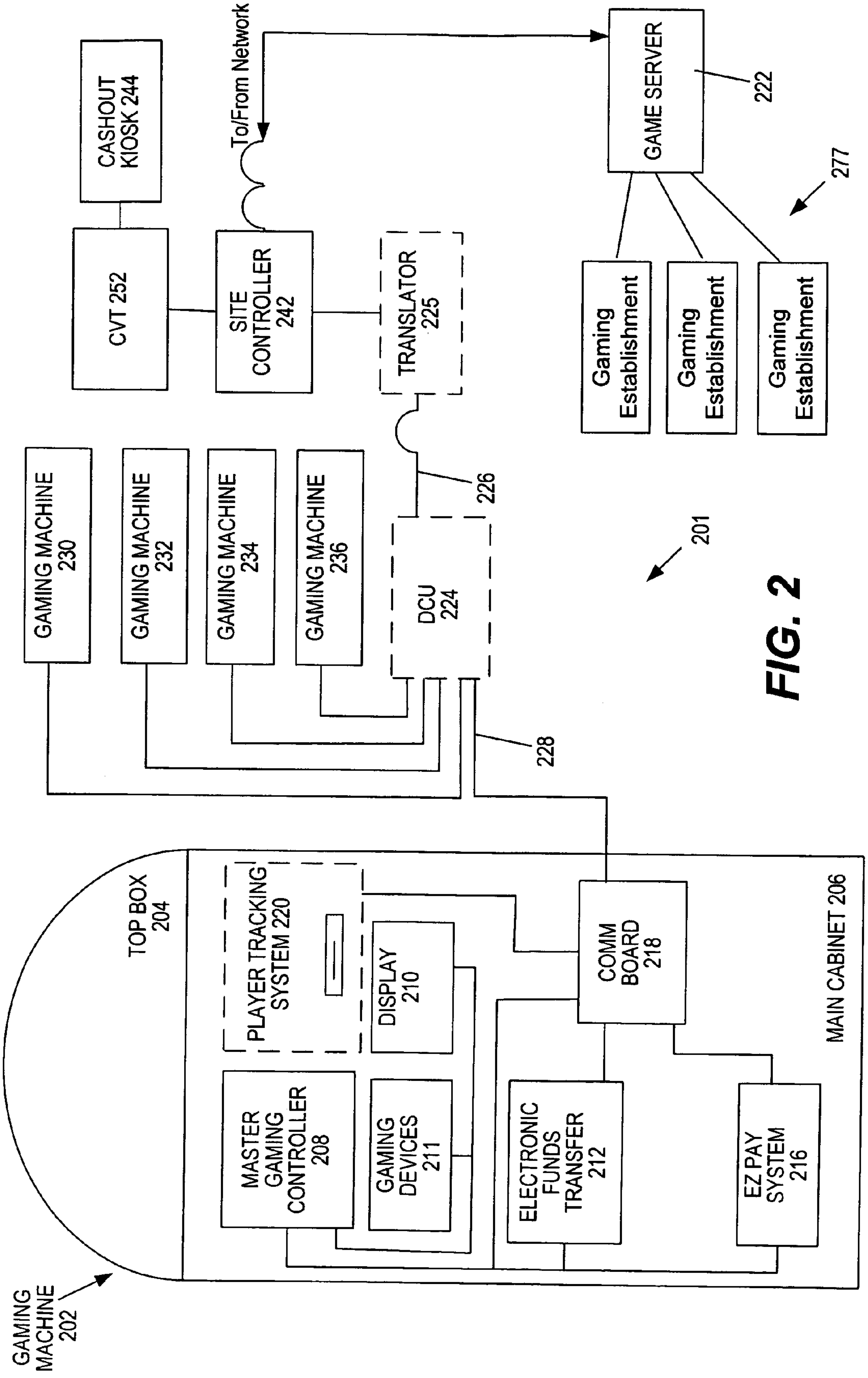
FIG. 2 shows a block diagram of a gaming system that may be used to implement embodiments of the present invention.

A gaming system 277 that may be used to implement embodiments of the invention, is depicted in FIG. 2. Components of the gaming system 277 can be situated in one or more gaming establishments. A gaming establishment 201 could be any sort of gaming establishment, such as a casino, a card room, an airport, a store, etc. In this example, gaming system 277 is illustrated as being associated with more than one gaming establishment, all of which are networked to game server 222.

Here, gaming machine 202, and the other gaming machines 230, 232, 234, and 236, include a main cabinet 206 and a top box 204. The main cabinet 206 houses the main gaming elements and can also house peripheral systems, such as those that utilize dedicated gaming networks. The top box 204 may also be used to house these peripheral systems.

The master gaming controller 208 controls the game play on the gaming machine 202 according to instructions and/or game data from game server 222 or stored within gaming machine 202 and receives or sends data to various input/output devices 211 on the gaming machine 202. In one embodiment, master gaming controller 208 includes processor(s) and other apparatus of the gaming machines described above in FIG. 1. The master gaming controller 208 may also communicate with a display 210.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 208 may also communicate with EFT system 212, EZPay™ system 216 (a proprietary cashless ticketing system of IGT), and player tracking system 220. The systems of the gaming machine 202 communicate the data onto the network 228 via a communication board 218.

It will be appreciated by those of skill in the art that embodiments of the present invention could be implemented on a network with more or fewer elements than are depicted in FIG. 2. For example, player tracking system 220 is not a necessary feature of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment.

Moreover, DCU 224 and translator 225 are not required for all gaming establishments 201. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machines are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered. A network device that links a gaming establishment with another gaming establishment and/or a central system will sometimes be referred to herein as a "site controller." Here, site controller 242 provides this function for gaming establishment 201. Site controller 242 is connected to a central system and/or other gaming establishments via one or more networks, which may be public or private networks. Among other things, site controller 242 communicates with game server 222 to obtain game data, such as ball drop data, bingo card data, etc.

In the present illustration, gaming machines 202, 230, 232, 234 and 236 are connected to a dedicated gaming network 228. In general, the DCU 224 functions as an intermediary between the different gaming machines on the network 228 and the site controller 242. In general, the DCU 224 receives data transmitted from the gaming machines and sends the data to the site controller 242 over a transmission path 226. In some instances, when the hardware interface used by the gaming machine is not compatible with site controller 242, a translator 225 may be used to convert serial data from the DCU 224 to a format accepted by site controller 242. The translator may provide this conversion service to a plurality of DCUs.

Further, in some dedicated gaming networks, the DCU 224 can receive data transmitted from site controller 242 for communication to the gaming machines on the gaming network. The received data may be, for example, communicated synchronously to the gaming machines on the gaming network.

Here, CVT 252 provides cashless and cashout gaming services to the gaming machines in gaming establishment 201. Broadly speaking, CVT 252 authorizes and validates cashless gaming machine instruments (also referred to herein as "tickets" or "vouchers"), including but not limited to tickets for causing a gaming machine to display a game result and cash-out tickets. Moreover, CVT 252 authorizes the exchange of a cashout ticket for cash. These processes will be described in detail below. In one example, when a player attempts to redeem a cash-out ticket for cash at cashout kiosk 244, cashout kiosk 244 reads validation data from the cashout ticket and transmits the validation data to CVT 252 for validation. The tickets may be printed by gaming machines, by cashout kiosk 244, by a stand-alone printer, by CVT 252, etc. Some gaming establishments will not have a cashout kiosk 244. Instead, a cashout ticket could be redeemed for cash by a cashier (e.g. of a convenience store), by a gaming machine or by a specially configured CVT.

Figure 3:
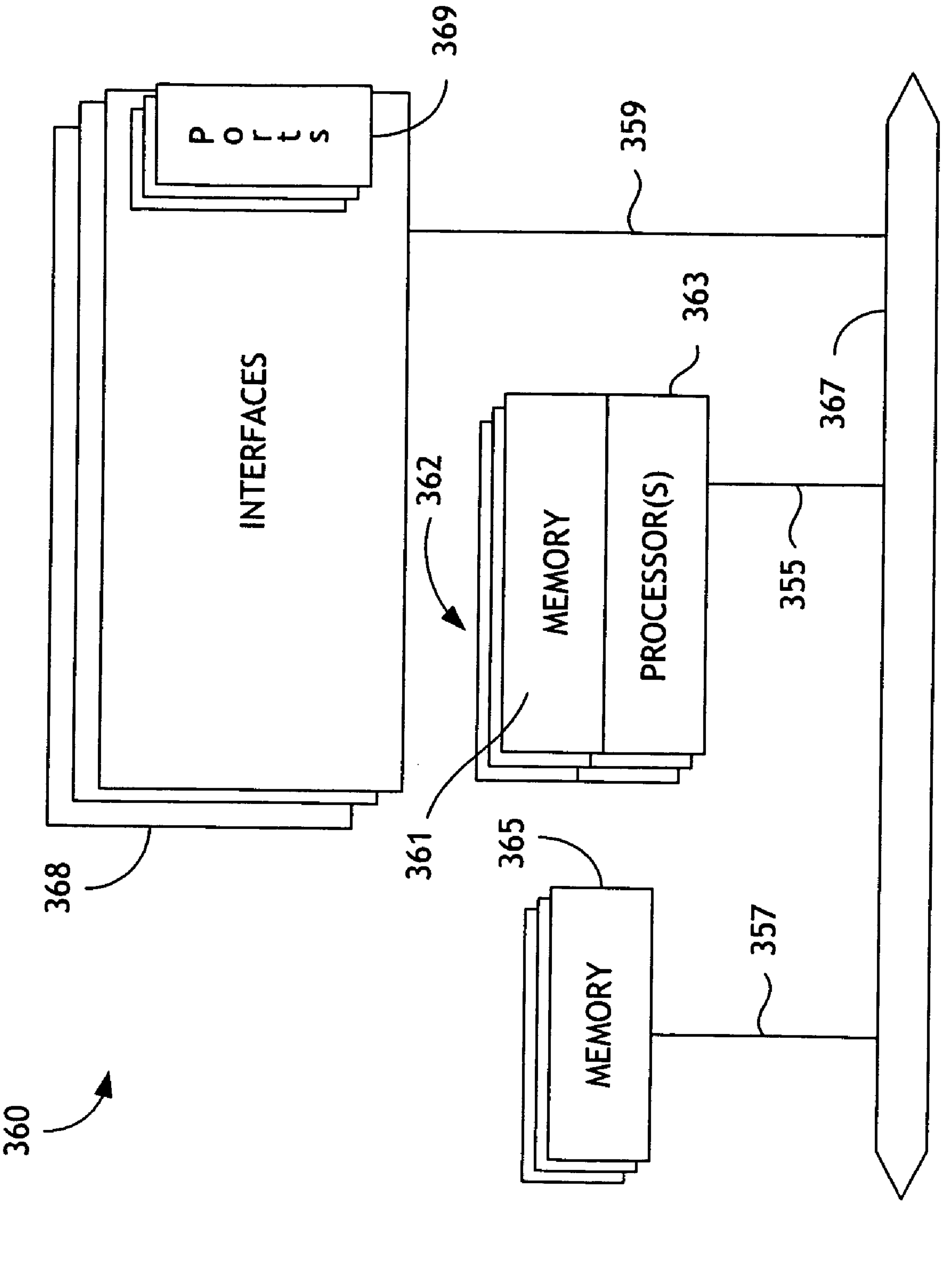
FIG. 3 shows a block diagram of a network device that can be configured as a server or other data processing apparatus for implementing embodiments of the present invention.

FIG. 3 illustrates an example of a network device that may be configured as a server for implementing some methods and apparatus of the present invention. Network device 360 includes a master central processing unit (CPU) 362, interfaces 368, and a bus 367 (e.g., a PCI bus). Generally, interfaces 368 include ports 369 appropriate for communication with the appropriate media. In some embodiments, one or more of interfaces 368 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 368 control such communications-intensive tasks as media control and management. By providing separate processors for the communications-intensive tasks, interfaces 368 allow the master microprocessor 362 efficiently to perform other functions such as routing computations, network diagnostics, security functions, etc.

The interfaces 368 are typically provided as interface cards (sometimes referred to as "linecards"). Generally, interfaces 368 control the sending and receiving of data packets over the network and sometimes support other peripherals used with the network device 360. Among the interfaces that may be provided are FC interfaces, Ethernet interfaces, frame relay interfaces, cable interfaces, DSL interfaces, token ring interfaces, and the like. In addition, various high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 362 may be responsible for implementing specific functions associated with the functions of a desired network device. According to some embodiments, CPU 362 accomplishes all these functions under the control of software including an operating system and any appropriate applications software.

CPU 362 may include one or more processors 363 such as a processor from the Motorola family of microprocessors or the MIPS family of microprocessors. In an alternative embodiment, processor 363 is specially designed hardware for controlling the operations of network device 360. In a specific embodiment, a memory 361 (such as non-volatile RAM and/or ROM) also forms part of CPU 362. However, there are many different ways in which memory could be coupled to the system. Memory block 361 may be used for a variety of purposes such as, for example, caching and/or storing data, programming instructions, etc.

Regardless of the network device's configuration, it may employ one or more memories or memory modules (such as, for example, memory block 365) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 3 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 3) or switch fabric based (such as a cross-bar).

Figure 4:
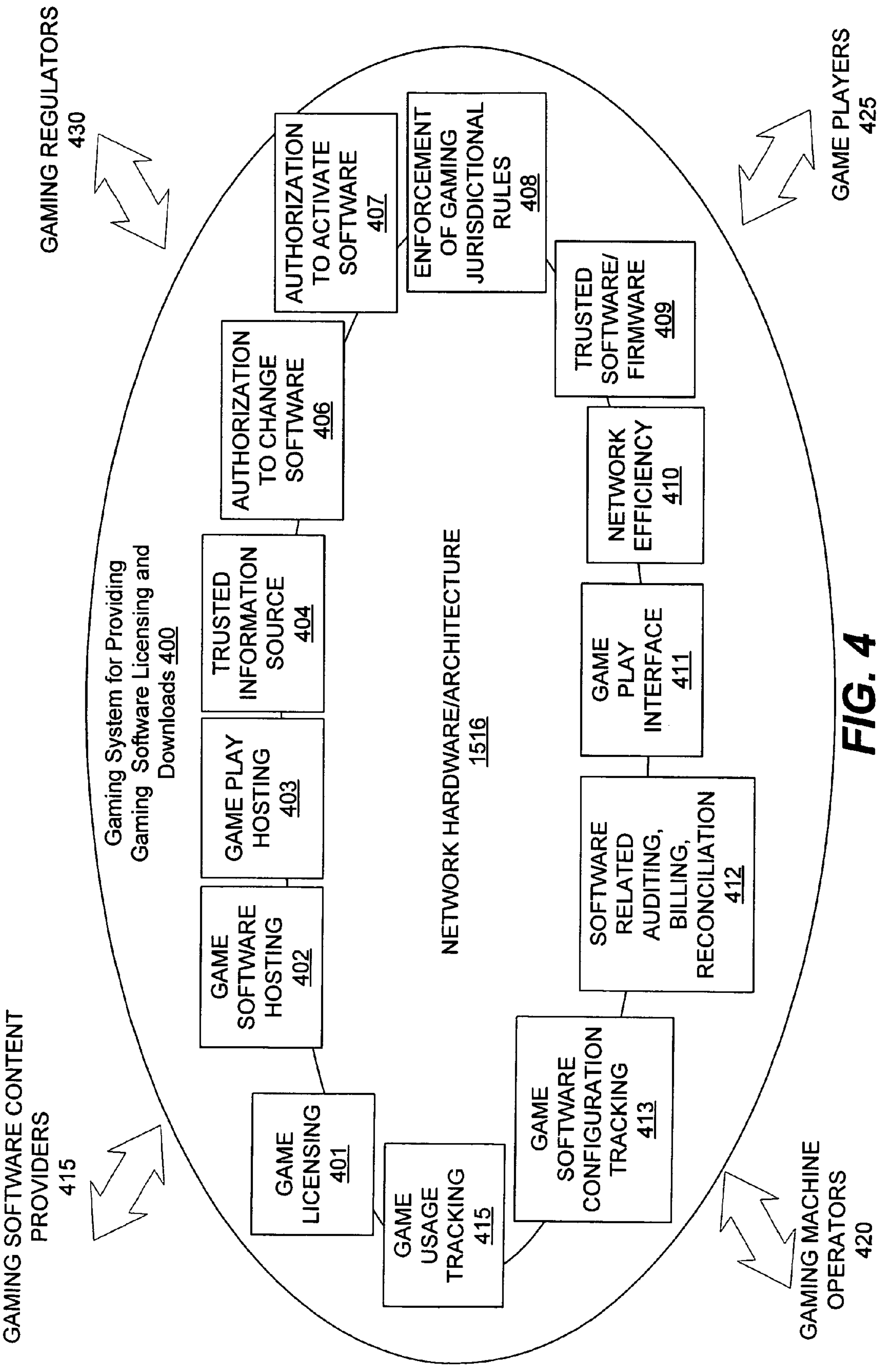
FIG. 4 shows a functional block diagram of components of the gaming system for providing gaming software licensing and downloads, constructed according to one embodiment of the present invention.

In FIG. 4, the components of a gaming system 400 for providing game software licensing and downloads are described functionally. The described functions may be instantiated in hardware, firmware and/or software and executed on a suitable device. In the system 400, there may be many instances of the same function, such as multiple game play interfaces 411. Nevertheless, in FIG. 4, only one instance of each function is shown. The functions of the components may be combined. For example, a single device may comprise the game play interface 411 and include trusted software and firmware 409.

The gaming system 400 may receive inputs from different groups/entities and output various services and/or information to these groups/entities. For example, game players 425 primarily input cash or indicia of credit into the system, make game selections that trigger software downloads, and receive entertainment in exchange for their inputs. Game software content providers 415 provide game software for the system and may receive compensation for the content they provide based on licensing agreements with the gaming machine operators. Gaming machine operators 420 select game software for distribution, distribute the game software on the gaming devices in the system 400, and receive revenue for the use of their software to compensate the gaming machine operators. The gaming regulators 430 may provide rules and regulations that must be applied to the gaming system and may receive reports and other information confirming that rules are being obeyed.

In the following paragraphs, details of each component and some of the interactions between the components are described with respect to FIG. 4. The game software licensing host 401 may be a server connected to a number of remote gaming devices that provides licensing services to the remote gaming devices. For example, in some embodiments, the license host 401 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 415 may track the usage of game software on a plurality of devices in communication with the host. The game usage-tracking host 415 may be in communication with a plurality of game play hosts and gaming machines. From the game play hosts and gaming machines, the game usage tracking host 415 may receive updates of an amount that each game available for play on the devices has been played and an amount that has been wagered per game. This information may be stored in a database and used for billing according to methods described in a utility based licensing agreement.

The game software host 402 may provide game software downloads, such as downloads of game software or game firmware, to various devious in the game system 400. For example, when the software to generate the game is not available on the game play interface 411, the game software host 402 may download software to generate a selected game of chance played on the game play interface. Further, the game software host 402 may download new game content to a plurality of gaming machines via a request from a gaming machine operator.

In one embodiment, the game software host 402 may be combined with a game software configuration-tracking host 413. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in commonly assigned U.S. Pat. No. 6,645,077, by Rowe, entitled, "Gaming Terminal Data Repository and Information System," filed Dec. 21, 2000, which is hereby incorporated by reference in its entirety and for all purposes.

A game play host device 403 may be a host server connected to a plurality of remote clients that generates games of chance that are displayed on a plurality of remote game play interfaces 411. For example, the game play host device 403 may be a server that provides central determination for a bingo game play played on a plurality of connected game play interfaces 411. As another example, the game play host device 403 may generate games of chance, such as slot games or video card games, for display on a remote client. A game player using the remote client may be able to select from a number of games that are provided on the client by the host device 403. The game play host device 403 may receive game software management services, such as receiving downloads of new game software, from the game software host 402 and may receive game software licensing services, such as the granting or renewing of software licenses for software executed on the device 403, from the game license host 401.

In particular embodiments, the game play interfaces or other gaming devices in the gaming system 400 may be portable devices, such as electronic tokens, cell phones, smart cards, tablet PC's and PDA's. The portable devices may support wireless communications and thus, may be referred to as wireless mobile devices. The network hardware architecture 416 may be enabled to support communications between wireless mobile devices and other gaming devices in gaming system. In one embodiment, the wireless mobile devices may be used to play games of chance.

The gaming system 400 may use a number of trusted information sources. Trusted information sources 404 may be devices, such as servers, that provide information used to authenticate/activate other pieces of information. CRC values used to authenticate software, license tokens used to allow the use of software or product activation codes used to activate software are examples of trusted information that might be provided from a trusted information source 404. Trusted information sources may be a memory device, such as an EPROM, that includes trusted information used to authenticate other information. For example, a game play interface 411 may store a private encryption key in a trusted memory device that is used in a private key-public key encryption scheme to authenticate information from another gaming device.

When a trusted information source 404 is in communication with a remote device via a network, the remote device will employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities. Details of zero knowledge proofs that may be used with the present invention are described in U.S. Patent Application No. 2003/0203756, by Jackson, filed on Apr. 25, 2002 and entitled, "Authentication in a Secure Computerized Gaming System," which is hereby incorporated by reference in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 400 of the present invention may include devices 406 that provide authorization to download software from a first device to a second device and devices 407 that provide activation codes or information that allow downloaded software to be activated. The devices, 406 and 407, may be remote servers and may also be trusted information sources. One example of a method of providing product activation codes that may be used with the present invention is describes in previously incorporated U.S. Pat. No. 6,264,561.

A device that monitors a plurality of gaming devices to determine adherence of the devices to gaming jurisdictional rules 408 may be included in the system 400. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as a CRC, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing on a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may be used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 400 may utilize trusted software and/or trusted firmware. Trusted firmware/software is trusted in the sense that it is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 416 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in the present inventions, network efficient devices 410 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 412. For example, a software licensing billing server may generate a bill for a gaming device operator based upon a usage of games over a time period on the gaming devices owned by the operator. In another example, a software auditing server may provide reports on game software downloads to various gaming devices in the gaming system 400 and current configurations of the game software on these gaming devices.

At particular time intervals, the software auditing server 412 may also request software configurations from a number of gaming devices in the gaming system. The server may then reconcile the software configuration on each gaming device. In one embodiment, the software auditing server 412 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 4. Many of the interactions are coupled. For example, methods used for game licensing may affect methods used for game downloading and vice versa. For the purposes of explanation, details of a few possible interactions between the components of the system 400 relating to software licensing and software downloads have been described. The descriptions are selected to illustrate particular interactions in the game system 400. These descriptions are provided for the purposes of explanation only and are not intended to limit the scope of the present invention.

Embodiments of the present invention provide for a mobile device carried by a player to interact with a wireless interface of the gaming machine. The interaction of a mobile device and a gaming machine is described in commonly assigned U.S. Pat. No. 6,896,618, "Point of Play Registration on a Gaming Machine,"which is hereby incorporated by reference in its entirety for all purposes. In U.S. Pat. No. 6,896,618, Benoy et al. describe a method of registering a player to a loyalty program such as a player tracking program at a gaming machine, in which the player can interact and exchange information with the gaming machine using a mobile device such as a mobile phone. In particular, a hand-held wireless device may communicate with a player tracking unit, a gaming machine, or directly with a loyalty program server using a wireless communication standard such as Bluetooth, IrDA (Infrared Direct Access), IEEE 802.11a, IEEE 802.11b, IEEE 802.11x, hiperlan/2, and HomeRF.

Figure 5:
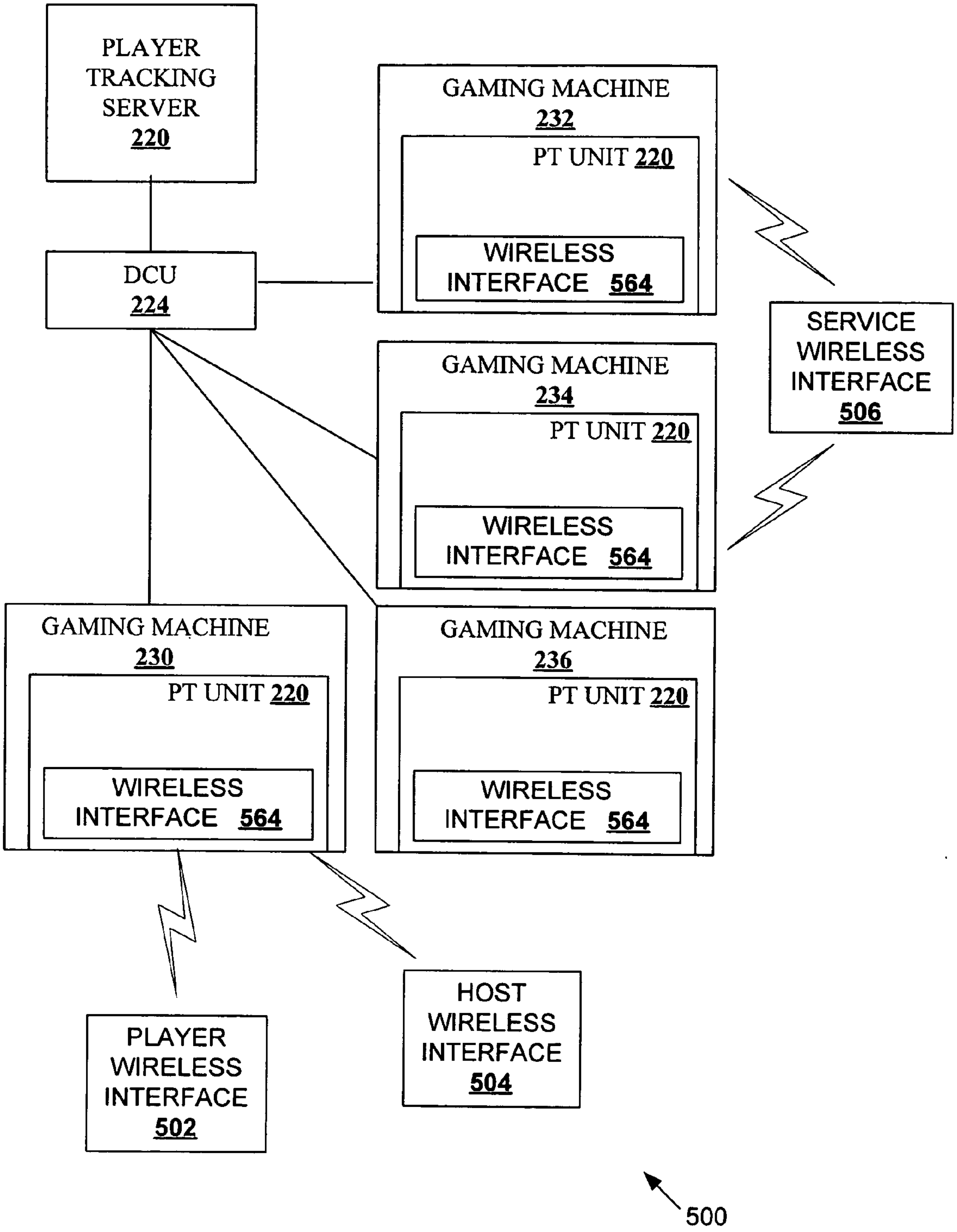
FIG. 5 shows a block diagram of a gaming system with a plurality of gaming machines having wireless interfaces, constructed according to one embodiment of the present invention.

Wireless communications capabilities can be integrated with player tracking services, as described in commonly assigned U.S. Pat. No. 6,908,387, "Player Tracking Communication Mechanisms in a Gaming Machine," by Hedrick et al., which is hereby incorporated by reference. For instance, FIG. 5 shows a gaming system 500 in which a plurality of gaming machines 230, 232, 234, and 236 have tracking units with wireless interfaces. In FIG. 5, each gaming machine in the system 500 includes a wireless interface 564, enabling wireless communication with that gaming machine. The wireless interface can be coupled to and controlled by master gaming controller 208. In one embodiment, as shown, the wireless interface 564 is constructed as a component of a player tracking unit 220, as shown in FIG. 5. The wireless interface 564 may be used to allow the player tracking unit and possibly the master gaming controller to communicate with portable wireless devices or stationary devices using a wireless communication standard. In some embodiments, the wireless interface 264 may be incorporated into the communication board 218 of FIG. 2. The wireless interface 564 may also be connected to an antenna.

In FIG. 5, through wireless interface 564, a gaming machine can communicate with a player wireless interface 502, a host wireless interface 504, and a server wireless interface 506. The host and server interfaces 504 and 506 can be implemented on gaming servers of the gaming network to enable communications with those devices. The player wireless interface 502 may be implemented in a mobile device such as a cell phone. The wireless interface 564 may be used to communicate with the mobile device carried by a player, a casino service representative or maintenance technician. In one embodiment, when the player is near the machine, the wireless interface device 564 and the wireless device carried by the player automatically detect each other and establish communications, allowing gaming information to be transferred between the wireless devices. As another example, the wireless interface may be accessed by the mobile device for a "point of play" registration of a game player at the gaming machine.

In one example, the wireless interface device 564 uses a wireless communication standard such as Bluetooth™ to communicate with portable wireless devices, although other wireless communication protocols such as IrDA (Infrared Direct Access), IEEE 802.11a, IEEE 802.11b, IEEE 802.11x (e.g. other IEE802.11 standards), hiperlan/2, and HomeRF may also be used. Bluetooth devices communicate on a frequency of 2.45 Gigahertz. Typically, Bluetooth devices send out signals in the range of 1 milliwatt. The signal strength limits the range of the devices to about 10 meters and also limits potential interference sources. Interference is also limited by using spread-spectrum frequency hopping. For instance, a device may use 79 or more randomly chosen frequencies within a designated range that change on a regular basis up to 1,600 times a second. Thus, even if interference occurs, it is likely only to occur for a short period of time.

When Bluetooth-capable devices come within range of one another, an electronic conversation takes place to determine whether they have data to share or whether one needs to control the other. The connection process is performed automatically. Once a conversation between the devices has occurred, the devices form a network. Bluetooth systems create Personal-Area Networks (PAN) or "piconets". While the two or more devices in a piconet remain in range of one another, the distances between the communications devices may vary as the wireless devices are moved about. Once a piconet is established, such as between the wireless interface device 564 and a portable wireless device, the members of the piconet randomly hop frequencies in unison so they remain in touch with another and avoid other piconets that may be operating in proximity to the established piconet. When Bluetooth is applied in a casino environment, many such piconets may be operating simultaneously.

Details of the Bluetooth™ standard and the Bluetooth™ special interest group may be found at www.Bluetooth.com. Bluetooth and other wireless communications protocols for communications between devices, and associated business commerce schemes, are also described in "Networking Gets Personal," by Bravo-Escos, EE Review, January 2002, and "Preferred Payment Architecture: Local Payment, Local Payment Discussion Document 1.0, by Saleem, published by the Mobey Forum (www.mobeyforum.org) in September 2002, both of which are hereby incorporated by reference.

IrDA is a standard for devices to communicate using infrared light pulses. A hand-held device, such as a PDA may communicate with the player tracking unit and the gaming machine using infrared light pulses using the IrDA communication standard or some other infrared communication standard. An infrared interface on the player tracking unit or located on the gaming machine may be used to receive the infrared pulses from a device communicating using infrared pulses. Generally, infrared communications using IrDA require line of sight communications.

The network shown in FIG. 5 is only one example of many possible embodiments of the present invention. The gaming machines and other gaming devices supporting wireless communications comprise a wireless network. The wireless game play network may be a part of a larger system network. The larger system network may provide the capability for a large number of gaming machines throughout a casino to be on the same network. High-gain antennas and repeaters may be used to expand the range of the wireless game players allowing them to work in all areas of a casino/hotel complex, including hotels rooms and pool area. Racetracks, large bingo parlors and special outdoor events may also be covered within the network.

The network may also include wired access points that allow a mobile device to be plugged directly into the network. For example, a mobile device may include an Ethernet connector that may be directly plugged into the network at a suitable access point. The direct network connectors may be provided with cradles used to charge the mobile device. The charging cradles may be located at many locations within the network.

Co-pending and commonly assigned U.S. patent application Ser. No. 10/062,002 for "Gaming System and Gaming Method," by Paulsen et al., filed Feb. 1, 2002, which is hereby incorporated by reference, describes techniques for tracking a player's position in a gaming environment using a wireless device carried by the player. In some embodiments of the present invention, any number of the same techniques described in application Ser. No. 10/062,002 for determining the position of the player are performed. For example, the mobile device may be designed to have a limited range of transmission and each gaming machine may be equipped with a receiving device, such as an antenna. Receipt of the transmission by one of the antennas will permit the player tracking system to determine the player's position based on the position of the machine associated with the receiving antenna. Alternatively, a distance/triangulation scheme may be used, or the mobile device may make use of the Global Positioning Satellite (GPS) system to determine the position of the mobile device. It will be further understood that the tracking system may track the player as he or she passes from location to location in a single casino, or in a group of casinos operated by a single gaming system operator, for example. In the later case, the casinos in the group of casinos may be distributed within a single city or state, or may be distributed across a country or throughout the world.

Figure 6:
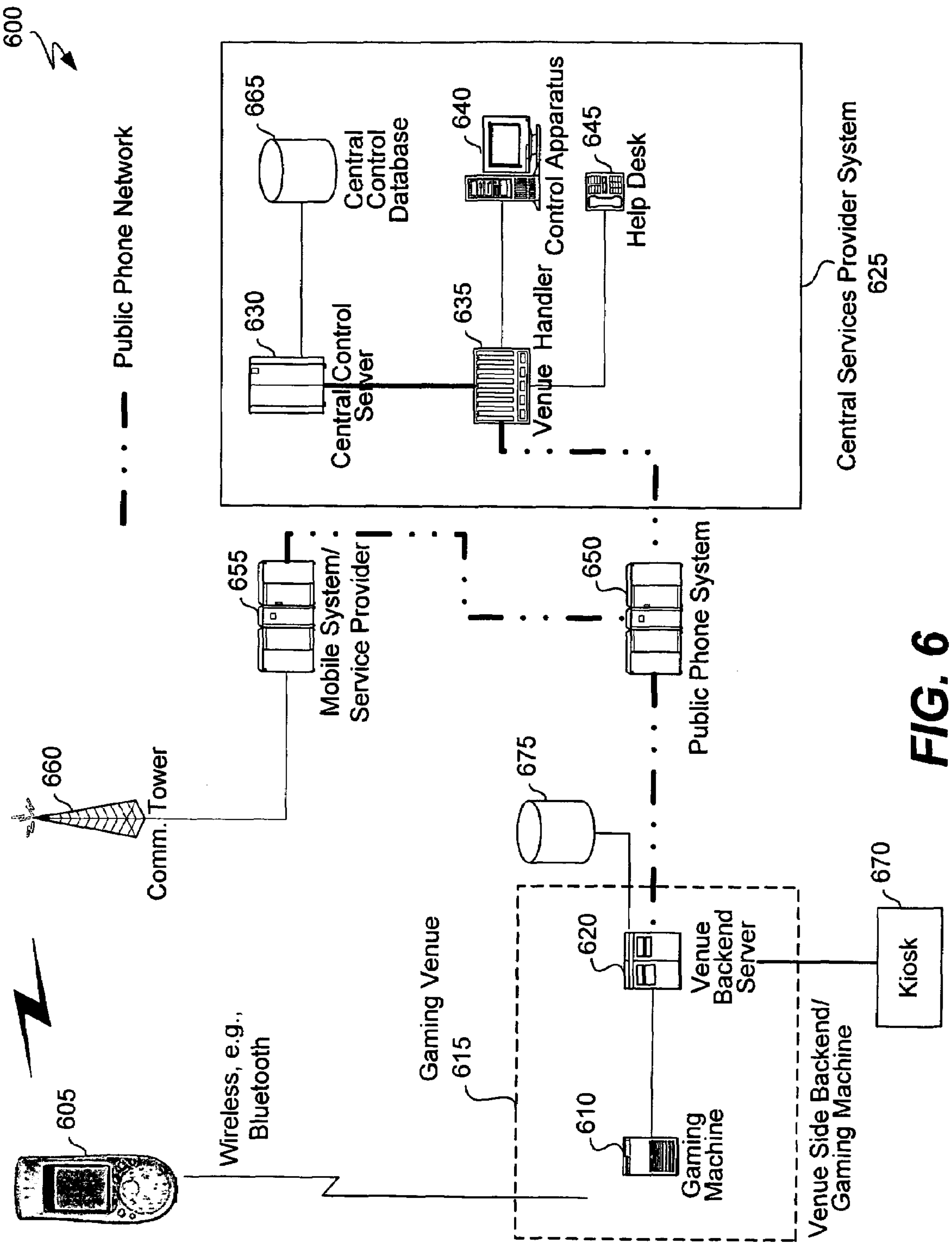
FIG. 6 shows a diagram of a system for registering a mobile device with a gaming machine, constructed according to one embodiment of the present invention.

FIG. 6 shows a system 600 for registering a mobile device 605 with a gaming machine 610, constructed according to one embodiment of the present invention. The system 600 of FIG. 6 provides the benefit of integrating gaming apparatus and a gaming network with a communications network, for instance, a mobile phone network. Accordingly, system 600 includes devices which enable this integration.

In FIG. 6, the system includes a gaming venue 615 such as a casino or game room in a hotel. The gaming venue 615 includes a plurality of gaming machines, including gaming machine 610 coupled to a dedicated network, as described above with respect to FIGS. 2 and 5. The gaming venue 615 includes a venue backend server 620 coupled to one or more of the gaming machines over the gaming network. While backend server 620 is described as a single device, those skilled in the art will appreciate that the described operations of backend server 620 can be implemented in a plurality of servers without departing from the scope of the present invention.

In FIG. 6, the system 600 further includes a central services provider system 625, also referred to herein as a "central services provider" 625, providing features described herein. Central services provider 625 can be situated in a different location than gaming venue 615, or in the same vicinity, depending on the desired implementation. For example, central services provider can be located in one gaming site, such as a hotel, and gaming venue 615 can be in a different gaming site such as a remote casino, connected to one another over a suitable communications network. In central services provider 625, there is a central control server 630 coupled to a central database 665. The central control server 630 is coupled to a venue handler 635. The venue handler 635 serves as a hub for the central services provider 625, coupling the central control server 630, a control apparatus 640, and a helpdesk 645 operated by suitable personnel.

In FIG. 6, central services provider 625 and gaming venue 615 are in communication with one another over a public phone system 650. In particular, venue backend server 620 of the gaming venue 615 communicates with venue handler 635 of central services provider 625 through the public phone system 650. In FIG. 6, a mobile system 655 is in communication with public phone system 650. The public phone system 650 incorporates suitable interfaces and data processing apparatus for communicating with the gaming venue 615, a mobile network 655, and central services provider 625. In this way, public phone system 650 serves as a communications hub for the major components of system 600, namely gaming venue 615, central services provider 625 and a mobile network 655.

The mobile system 655 represents one or more components of a mobile network such as a conventional cellular communications network for interacting with mobile devices, such as mobile device 605. Examples of mobile device 605 include wireless phones, PDAs, and other mobile devices known to those skilled in the art. Mobile device 605 accesses the mobile network through a communications tower 660 of the mobile network. In this way, mobile device 605 can interact with mobile system 655 and, in turn, with venue backend server 620 and venue handler 635 through public phone system 650. In an alternative WiFi implementation, the communications tower 660 is a wireless access point, e.g. mounted on the ceiling of the casino, through which the cell phone can establish a communications session with a voice-over-IP network, Ethernet, or other communications network operated by the casino, and then connect to the gaming machine.

Figure 7:
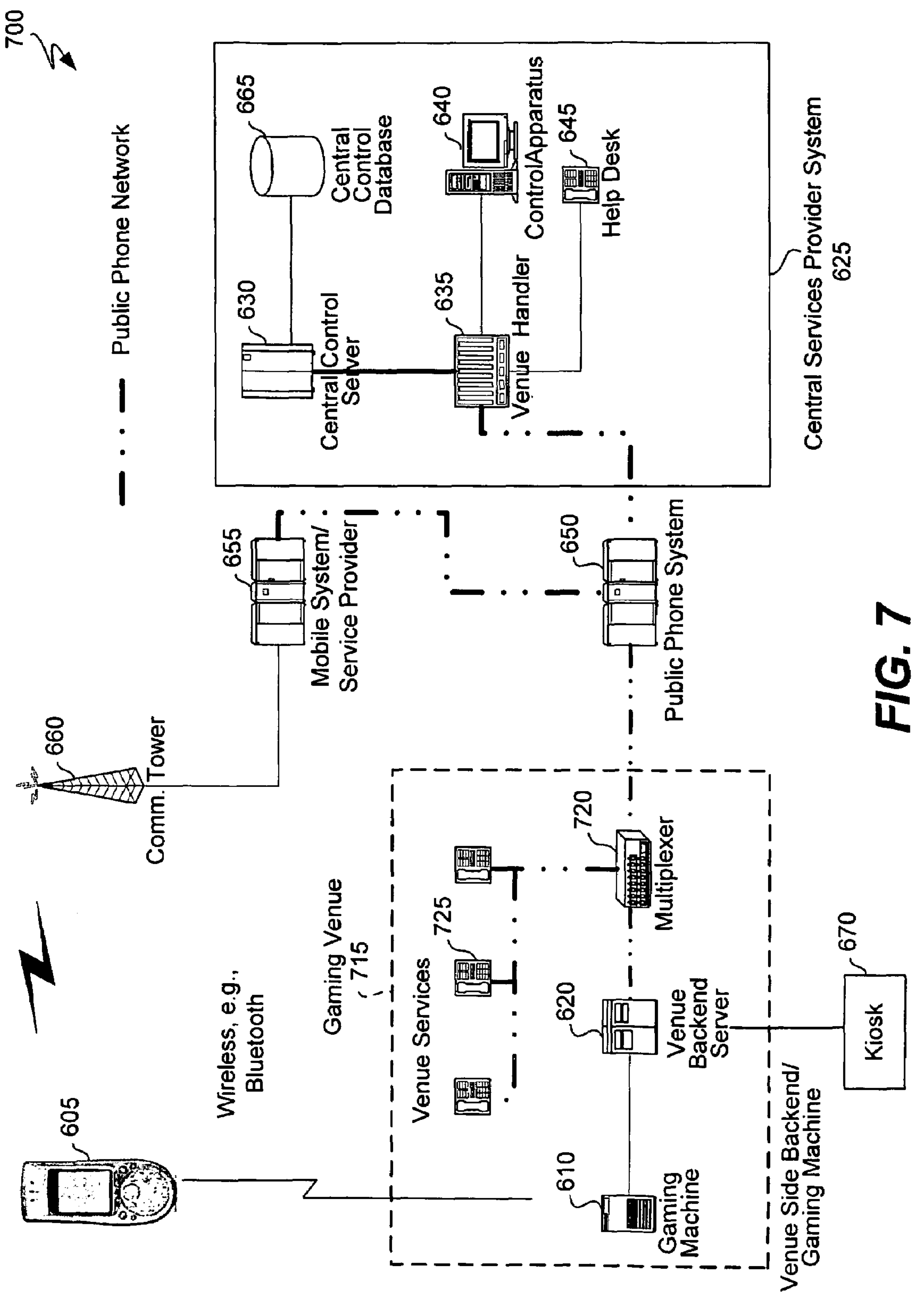
FIG. 7 shows a system for registering a mobile device with a gaming machine, constructed according to another embodiment of the present invention.

FIG. 7 shows a system 700 which is similar in construction to and incorporates some of the components of system 600 of FIG. 6. However, in FIG. 7, a gaming venue 715 of the system has an alternative arrangement to gaming venue 615 of FIG. 6. Gaming venue 715 includes a multiplexer 720 coupled between venue backend server 620 and public phone system 650. A plurality of venue services 725 enabled through phones, servers and other processing devices (not shown) are coupled to multiplexer 720.

Figure 8:
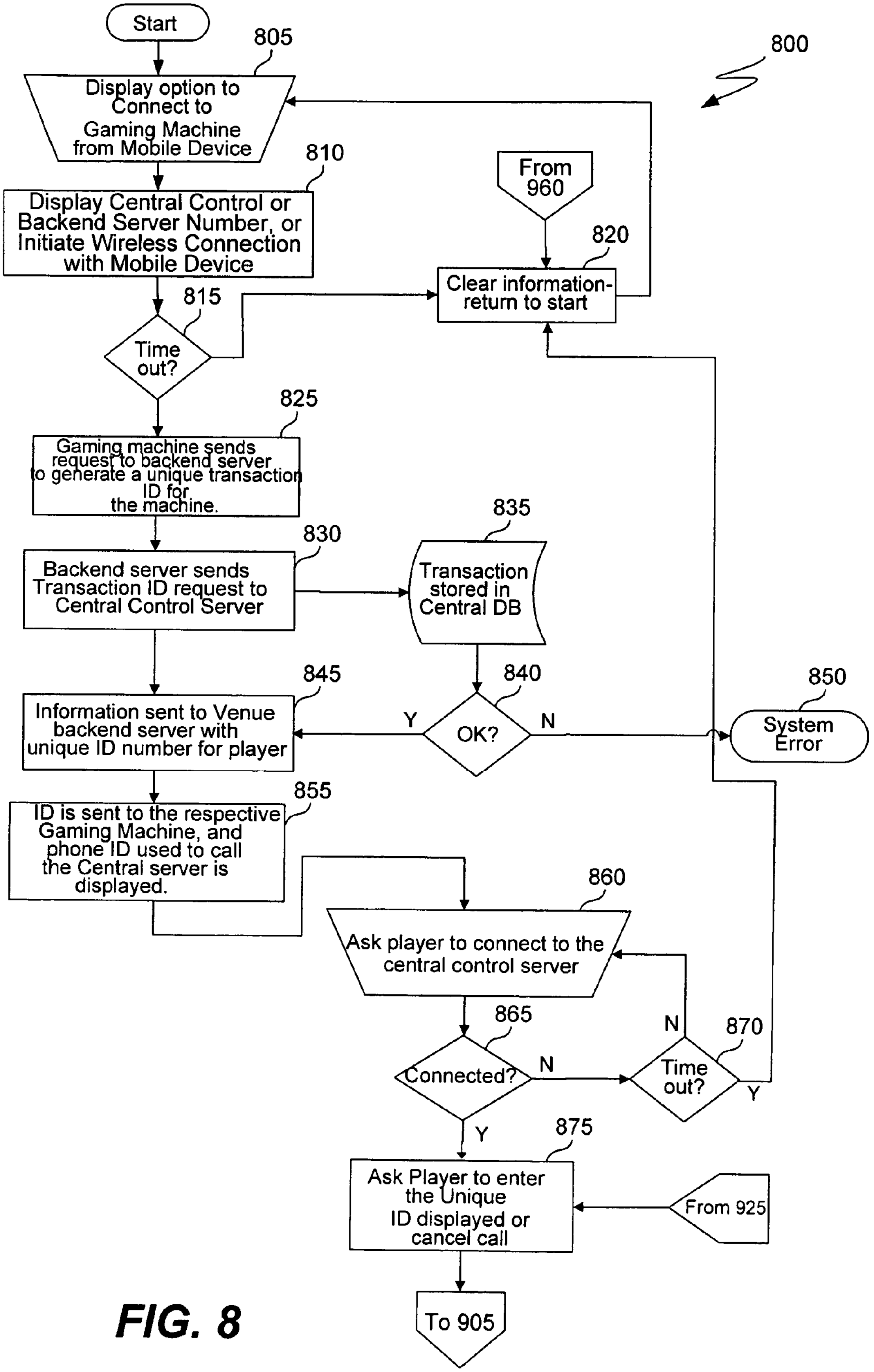
FIGS. 8 and 9 show a flow diagram of a method for registering a mobile device with a gaming machine, performed in accordance with one embodiment of the present invention.
Figure 9:
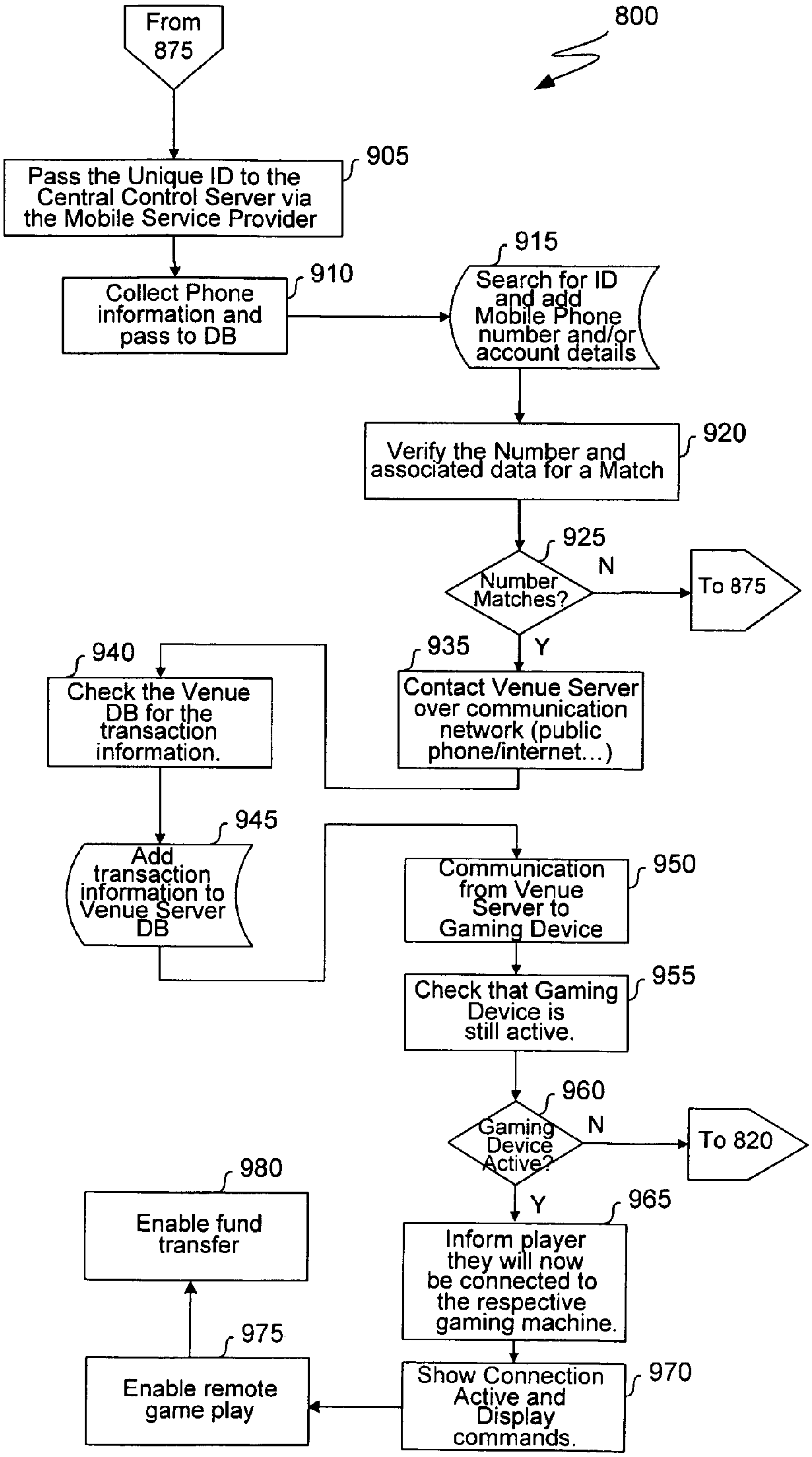

FIGS. 8 and 9 show a method 800 for registering a mobile device with a gaming machine, performed in accordance with one embodiment of the present invention. Method 800 is described with respect to the systems of FIGS. 6 and 7. In some embodiments, preferably near or before the beginning of method 800, an initial registration and authorization method 1100 is performed to introduce and validate the interaction of mobile device 605 with components of systems 600 or 700. This initial registration and authorization method 1100 is described in greater detail below with reference to FIG. 11. Those skilled in the art will appreciate that part or all of method 800 can be combined with part or all of the initial registration and authorization method 1100 described below without departing from the scope of the present invention.

In FIG. 8, the method 800 begins in step 805, where one of the displays or information panel on the gaming machine 610 displays an option for the player to connect to the gaming machine with a mobile device carried by the player. This option can be displayed in response to a player request, for instance, by pressing a button on the gaming machine. In one example of step 805, during or after game play on the machine 2 shown in FIG. 1, the information panel displays a suitable prompt such as, "Press button 1 to secure gaming machine with mobile device." The player can continue with method 800 by pressing a designated button 32 or designated portion of a touch screen in information panel 36 of the gaming machine, as shown in FIG. 1.

In FIG. 8, when the player makes the designated selection to secure the gaming machine, the master gaming controller 208 of the gaming machine proceeds from step 805 to step 810 of method 800, wherein an access number is displayed on the display. The player can dial this access number using the mobile device. In one embodiment, the access number is a telephone number for a gaming server such as backend server 620, or central control server 630 in an alternate embodiment, provided by public phone system 650. Calling the access number with mobile device 605 establishes a communications session between mobile device 605 and backend server 620 through mobile network 655 and public phone system 650, as shown in FIGS. 6 and 7. In an alternative embodiment, the mobile device 605 communicates with backend server 620 through a wireless communications path established between mobile device 605 and gaming machine 610. As mentioned above, in implementations where both the mobile device 605 and gaming machine 610 have wireless interfaces with automated communications protocols such as Bluetooth, in step 810, the gaming machine can send a text or voice message to the mobile device 602, requesting that the player confirm the desire to secure the gaming machine. For security, when the gaming machine communicates directly with the mobile device, preferably the player has pre-registered the mobile device with the backend server and/or central control server, as described with respect to FIG. 11 below, providing a mobile device identification number, player identification information, and other authentication information to validate the transaction on a device and player level.

In FIG. 8, in step 810, when the access number is displayed, in one embodiment, the master gaming controller 208 sets a predetermined amount of time for the mobile device to call the number or otherwise establish communications between the mobile device 605 and backend server 620, e.g. through a wireless connection with gaming machine 610. In step 815, when the user fails to contact the backend server 620 within the allotted timeout period, the method proceeds to step 820, wherein information exchanged during steps 805 and 810 is cleared. Following step 820, the method returns to 805.

Returning to step 815, when the player establishes communications with backend server 620 within the timeout period, the backend server 620 sends a message to gaming machine 610 confirming that the access number was called. Responsive to this confirmation message, in step 825, the gaming machine 610 sends a request message to backend server 620 for a security code, such as a unique transaction ID or digital signature. The transaction ID or digital signature is preferably a unique ID number that can be associated with the particular requesting player, mobile device, and/or gaming session during which the ID number was requested. The transaction ID and digital signatures are only examples of security codes which can serve this purpose.

The security codes can be generated, recorded, and managed at the central control server 630 using conventional number generation, recording and management techniques. To provide unique and secure digital signatures, techniques using conventional one-way security functions, public key encryption and the like can be employed. In one embodiment, a gaming machine provides a mixed one time public key for the player. The key is hashed with the player's mobile number (or other data) to form a private key. The public key and private key are stored in a storage medium for security purposes along with additional data provided by the gaming machine.

In FIG. 8, in step 825, responsive to receiving the security code request message, a unique security code for gaming machine 610 is generated or retrieved from a pool of IDs. In one embodiment, this handling of digital signatures or transaction IDs takes place in a designated server in system 600, such as a particular backend server 620 or central control server 630 of central services provider 625. In one embodiment, the backend server 620 requests the security code from the central control server 630 which retrieves the code from a pool of codes stored in central database 665. Those skilled in the art will appreciate that, in an alternative embodiment, the backend server 620 implements the security code handling features of central control server 630. In this alternative embodiment, the backend server receives the security code request, retrieves or generates the code locally, and provides the code to the gaming machine. In another alternative embodiment, all of the primary functions of backend server 620 are implemented in central control server 630. In this way, central control server 630 serves various gaming machines at one or more gaming venues through venue handler 635 and, in some embodiments, is remotely located from gaming machine 610 at another gaming site. In this embodiment, as those skilled in the art will appreciate, the communications between the mobile device and backend server described above are between the mobile device and central control server. The illustration of a separate backend server 620 and central control server 630 in FIGS. 6 and 7 represents one of several embodiments to achieve registration of a mobile device with a gaming machine in accordance with the present invention.

In FIG. 8, in step 830, backend server 620 sends a transaction ID request message to central control server 630. In step 835, responsive to receiving the request message, central server 630 retrieves from a central control database a transaction ID for delivery to the backend server 620. Also, in one embodiment, the central control server 630 confirms that the player and/or mobile device are registered with the central services provider system 625, as described in FIG. 11 below. Often, this involves a table or database lookup using the player's name, mobile device contact information, or other player identification information.

In FIG. 8, following step 835, the retrieved transaction ID is preferably recorded in a suitable storage medium for record keeping as to the distributed security codes. For example, when the security code is stored in the central control database 665 in step 835, the code may be associated with one or more records that contain player information such as credits, game history, player tracking data, player loyalty information, and possibly other data about the position, habits and/or preferences of the player associated with the security code. For instance, the central control server 630 may generate and maintain a position record in which data about the position of the player at any given time and over time is stored. This position record may be created and maintained by central control server 630 by receiving position data relating to the position of the player from a tracking system or service that is in communication with the mobile device by Bluetooth or other wireless means.

In FIG. 8, following step 830, in one embodiment, the method proceeds directly to step 845. In an alternative embodiment, after it is confirmed that the retrieved transaction ID is recorded in the central database, in step 840, the method proceeds to step 845, wherein the retrieved transaction ID information and other information is sent to the venue backend server 620 for the player. In step 840, in instances when the player or mobile device cannot be authenticated, or the transaction cannot be stored in the central database, a system error results in step 850.

In FIG. 8, following step 845, the security code, e.g. transaction ID number, is sent to the requesting gaming machine 610 operated by the player, in step 855. In one embodiment, in addition to the ID number, the mobile device phone number or other identifier of the mobile device used to establish communications with backend server 620 or central control server 630 is also displayed, for the player to confirm the transaction. The security code and mobile device number are displayed on a display of the gaming machine 620 for the player to read. Following step 855, the method proceeds to step 860, in which a request message can be displayed on the gaming machine, requesting the player to connect to the central control server 630 for entering the security code. In embodiments where the previous communications were between the mobile device and backend server, and the call is still active, the call can be automatically transferred from the backend server to the central control server to receive the security code. In another alternative embodiment, in step 860, the mobile device can communicate with the central control server by calling the server directly or, in one example, through a wireless connection to the gaming machine.

In FIG. 8, in one embodiment, a predetermined timeout period is again implemented to ensure that the player connects to the central control server 630 within that period. In step 865, it is confirmed whether the player has called or otherwise established a communications session with central control server 630. When the player has not connected to the server within the predetermined time, in step 870, the method returns to step 820, so the player will have to begin the registration process again. In step 870, when the timeout period has not lapsed, the player can be prompted again to connect to the central control server 630, by the method returning to step 860.

In FIG. 8, returning to step 865, when the player establishes a communications session with the central control server 630 using mobile device 605, the method proceeds to step 875, at which the central control server 630 prompts the player to enter the unique ID number displayed on the gaming machine or, if the player cannot do so, cancel the call. This prompt can be in the format of automated voice instructions from the backend server and/or phone system, a text message, e-mail message, or other suitable form of communication to the mobile device as will be understood by those skilled in the art. In step 875, in some embodiments, the central control server 630 can request additional security information such as the player's name, player tracking number, password, or other information to confirm the player's identity. The player enters the requested information by voice or manual entry using the mobile device. Conventional voice recognition processes at the phone system 650 or central control server 630 can be invoked to interpret the spoken information.

The method 800 continues in FIG. 9, following step 875, in which the security code and any other requested information is passed to central control server 630 through mobile system 655, public phone system 650, and venue handler 635 in step 905. Alternatively, when a wireless session is established, the security code and other information can be sent to the central control server 630 from backend server 620 through a wireless connection between gaming machine 610 and mobile device 605. Then, in step 910, a verification process for the security code and any other information relating to the mobile device 605 begins. In one embodiment, this verification involves collecting the security information at the central control server 630 and passing the information to a central database 665 or other suitable storage medium in communication with central control server 630 as a search query, in step 915, to search for the unique ID, the mobile device number, and possibly other information such as account details of the player holding the mobile phone.

In FIG. 9, in step 920, the central database 665 verifies whether the security code and any associated data match with one of the records in the central database. In step 925, when a match is found, the method 900 proceeds to step 935. In instances when no matches are found, the method preferably returns to step 875 of FIG. 8, to request that the unique ID be re-entered on the mobile device 605 by the player, and then a new transaction is generated. In an alternative embodiment and/or after a timeout period, when no match is found at step 925, the method returns to step 820, and the player must essentially re-start the registration method 800.

In FIG. 9, when a match is found in step 925, in step 935, the central control server 630 contacts the venue backend server 620 over a suitable communications network, such as public phone system 650, or another suitable data network such as the Internet. In one embodiment, the venue handler 635 of FIG. 6 acts as an intermediary between the phone system 650 and central control server 630. When communications are established between the central control server 630 and venue backend server 620, the method proceeds to step 940 to check a database or other suitable storage medium 675, herein referred to as the venue database, coupled to the backend server 620, for transaction information. In one embodiment, this transaction information includes information associated with the player. In one embodiment, the transaction information includes information associated with the gaming machine such as bonus features, play information, and special instructions (e.g., initiate a 'VIP' player mode).

The information contained in the venue database 675 generally relates to various local or venue specific actions or events such as game offers that may be associated with the gaming device selected or offered to the player. In one embodiment, information related to financial transactions (such as credit transfer, token redemption) is contained in the venue database 675. This financial transaction information may be associated to a local player tracking card, promotions and various offerings the player may signal to be associated with the mobile device and security code. Further, there may be a number of accounts associated with the one mobile device. Different codes entered at the mobile device may activate these accounts depending on the player's activity. For instance, the player can use the mobile device as a purchase tool to buy additional outcomes for download to the mobile device. The player can use the mobile device to access an account, such as a bank account, or player account with the casino, and transfer funds and/or credits to the gaming machine. Depending on the desired implementation, the mobile device can send an instruction message to a server controlling the account to perform the fund transfer. In some embodiments, the funds or credits can be transferred from the financial account to the gaming machine through an intermediary device such as a central server, or even the mobile device itself. Also, the player may have a 'tournament' account or husband/wife/friends account. The venue database 675 may also contain further information required for the connection to be established. Various rules may exist which trigger special instructions to the gaming machine 610 or central server 630. The central services provider 625 may also have certain information to provide to the venue database 675 such as transaction information for accounting/financial resolve between the provider and the venue (such as transaction fees).

In FIG. 9, in step 945, transaction information can be added to the venue server database. Following step 945, the method proceeds to step 950, in which the venue backend server 620 communicates with gaming machine 610 to confirm that the gaming machine is still active in step 955. This confirmation step is preferably included to provide some checking for instances when the gaming machine becomes inactive (e.g., the player cashes out), the transaction can be cancelled. In step 960, when the gaming machine is no longer active, the method returns to step 820 of FIG. 8 to clear the registers and return to the beginning of method 800 at step 805. In step 960, when the gaming machine is still active, the method proceeds to step 965, at which a message is generated and displayed at the gaming machine 620 and/or on the mobile device 605, informing the player that the mobile device 605 is registered with the particular gaming machine 610 and the game play has entered a remote game play state, for example. Then, in step 970, a status indicator is displayed on the gaming machine and/or sent to mobile device 605 indicating that the connection between the mobile device 605 and gaming machine 610 is active. Various other status indicators and commands can be displayed in step 970 as well. The indicator messages can be generated remotely or locally for display on the gaming machine, as will be appreciated by those skilled in the art.

In FIG. 9, in step 970, registration of the mobile device 605 with gaming machine 610 has been achieved, and a registration session begins. In one embodiment, this includes suspending the player's live game play session on the gaming machine and entering a remote game play state. In some implementations, registration further includes establishing and/or maintaining a direct wireless communications session, e.g. Bluetooth, between the mobile device 605 and gaming machine 610 during remote game play. In step 970, the association of mobile device 605 with gaming machine 610 can be carried out in various ways, and various actions can be taken using the mobile device 605. For example, the gaming machine can be locked or otherwise controlled by the mobile device 605, further communications connections can be established with the gaming machine, and additional services can be requested or enabled from the central services provider system 625. Further communications may involve direct local communication between the mobile device and the gaming machine in a mode such as Bluetooth.

In one embodiment, following registration of the mobile device 605 with gaming machine 610 in step 970, the method 800 proceeds to step 975, in which the player can remotely play games of chance on the secured machine 610 using mobile device 605. As mentioned above, mobile device 605 can be constructed as a wireless game player, as described in commonly assigned U.S. Pat. No. 6,846,238, entitled "Wireless Game Player," by Wells , which is hereby incorporated by reference. In one embodiment, the wireless game player receives game inputs for a playing a game of chance from input mechanisms located on the wireless game player and displays game outcomes for games on chance on a display screen located on the wireless game player. In one embodiment, all random number generation (RNG) events, game outcomes, meter information, game related information, and all cash transactions are maintained in the licensed (controlled) gaming machine and not the wireless game player. Thus, the wireless game player may be considered a remote extension of the licensed gaming machine.

Embodiments of the present invention provide a method of generating a wireless game play session on the mobile device, e.g. wireless game player, in communication with the gaming machine. In one embodiment, from the perspective of the gaming machine, the method may be generally characterized as comprising: 1) establishing communications with the wireless game player; 2) receiving a message from the wireless game player requesting the gaming machine to initiate a game of chance; 3) generating a game outcome for the game of chance; and 4) sending operating instructions to the wireless game player where the operating instructions are used by the wireless game player to present the game outcome for the game of chance.

In an alternative embodiment, the mobile device 605 is used in a table gaming environment. The table includes an interface enabling similar communication with the mobile device as provided by the gaming machine, as described above. The remote game play session enables the player to engage in proxy betting, e.g. where the player bets on the player's favorite participant in the live game play action occurring on the table.

Through a user interface on the mobile device or gaming machine, a player sends a request message to initiate remote game play. A process of identifying and approving the player for game play then follows. The approval process generally includes: a) player approval, including checking player ID information and authentication information, b) location approval, for instance, approving the geographic location of the mobile device or particular location within a gaming environment, and c) device approval, for instance, identifying and authenticating the mobile device to prevent unauthorized devices from accessing a private network including the gaming machines. When the player is identified and approved for remote game play, a gaming session is established between the mobile device and the gaming machine. As described in U.S. Pat. No. 6,846,238 in greater detail, the method may include one or more of the following: a) reserving the gaming machine for wireless game play, b) receiving a request from the wireless game player to select a game of chance to be played on the wireless game player, c) prior to establishing communications with the wireless game player, selecting a game of chance on the gaming machine, d) receiving a message containing a wager amount for the game of chance, e) receiving a message containing information from input signals generated on one or more input mechanisms located on the wireless game player, e) generating an encrypted message and sending the encrypted message to the wireless game player, f) receiving an encrypted message from the wireless game player and decrypting the encrypted message, g) initiating a player tracking session, h) adding credits to the gaming machine, i) storing a game history of games played on the wireless game player during the wireless game play session, j) generating a bonus game outcome and sending operating instructions to wireless game player used to present the bonus game outcome on the wireless game player, k) sending metering information generated during the wireless game play session to a player tracking server, l) authenticating the identity of a player using the wireless game player where the identity of the player is authenticated using biometric information received from the player and k) terminating the wireless game play session. In addition, the method may comprise sending entertainment content to the wireless game player where the entertainment content is selected from the group consisting of an advertisement, news, stock quotes, electronic mail, a web page, a message service, a locator service or a hotel/casino service, a movie, a musical selection, a casino promotion, a broadcast event, a player tracking service, a drink menu and a snack menu.

Embodiments of the present invention provide a method of generating a wireless game play session provided in a wireless game player in communication with a gaming machine. From the perspective of the mobile device, the method may be characterized as comprising: 1) establishing communications with the gaming machine; 2) receiving an input signal to initiate a game of chance from an input mechanism located on the wireless game player; 3) sending a message to the gaming machine indicating a game of chance has been initiated on the wireless game player; and 4) displaying a game outcome for the game of chance. The method may also comprise displaying entertainment content on the wireless game player wherein the entertainment content is selected from the group consisting of an advertisement, news, stock quotes, electronic mail, a web page, a message service, a locator service or a hotel/casino service, a movie, a musical selection, a casino promotion, a broadcast event, a player tracking service, a drink menu and a snack menu.

In particular embodiments, the method may include one or more of the following: a) receiving a message containing the game outcome generated on the gaming machine, b) generating a graphical presentation of the game outcome for the game of chance, c) booting the wireless game player, d) enabling game play on the wireless game player, d) receiving a game selection and sending the game selection to the gaming machine, e) receiving a wager amount for the game of chance and sending the wager amount to the gaming machine, f) receiving input signals from one or more input mechanisms located on the wireless game player and sending information from the input signals to the gaming machine, g) generating an encrypted message and sending the encrypted message to the gaming machine, h) receiving an encrypted message from the gaming machine and decrypting the encrypted message, i) receiving authentication information for a player using the wireless game player such as biometric information, a PIN number and a password, j) sending the authentication information to the gaming machine, k) receiving a message containing a bonus game outcome generated on the gaming machine and l) generating a graphical presentation of the bonus game outcome and displaying the graphical presentation of the bonus game outcome.

In one embodiment, game outcomes are sent from the machine to the mobile device in a substantially real-time manner, that is, as the outcomes are received at the gaming machine. In another embodiment, game outcomes are output on the mobile device in a time-shifted manner. For example, generated outcomes can be stored in a memory device within the gaming machine or within the mobile device after download for some period of time. Later, the stored outcomes are retrieved and output on the mobile device, for instance, when the player is ready to resume game play after taking a break.

In another embodiment, the remote game play operation of step 975 involves the player controlling the gaming machine by pressing appropriate keys on the mobile device. That is, ‘virtual buttons’ on the mobile device are assigned to correspond to buttons of the gaming machine. Button presses on the mobile device are sent as signals to the gaming machine to enable remote play of the machine.

As mentioned above, in step 980, a fund transfer operation is also enabled following registration of the mobile device with the gaming machine in step 970. The player can use the mobile device to access an account, such as a bank account, or player account with the casino, and transfer funds and/or credits to the gaming machine.

In step 980, as described in commonly assigned U.S. Pat. No. 6,739,975, Nguyen et al., for “Method for Cashless Gaming,” which is hereby incorporated by reference, in one embodiment, call data identifying a gaming system player is identified. The call is then initiated from the mobile device through a telephone call network to a financial center, which may be a bank, a money market fund, a clearinghouse, or another financial institution at which the player has an account. A cash transfer is made, based on the call data, with appropriate PIN numbers and other coded material as necessary to identify and legitimize the player and the wireless call. The cash transfer may be credited to the mobile device by the financial institution, typically by an encrypted transmission of data that is stored in the mobile device and authenticated by appropriate transaction codes. Alternatively, the cash transfer may be credited to a casino on behalf of the player.

One then communicates, simultaneously or later, using the mobile device, with the casino to transfer a portion (which may include all) of the predetermined cash balance from the mobile device to the credit of a particular gaming machine, which may be identified by a number or the like. This data may be provided directly to the gaming machine or via a central computer in the casino to the data machine, to enable the gaming machine to be played with the electronic cash transferred to it, being essentially identical to actual cash, thus providing the player with an electronic form of cash which may be used with the gaming machine. The player thus plays the particular gaming machine, using that portion of the cash balance, which has been transferred to the machine.

Thereafter, a subsequent step may be made, of communicating, using the mobile device, with the casino to obtain transfer of a cash balance from the particular gaming machine back to the mobile device (or to the casino, crediting the player). This cash balance may comprise winnings, and it also may comprise electronic cash initially provided by the above method to the machine.

The remote session of game play when the gaming machine is secured is referred to herein as a remote gaming session, or remote game play state. The backend server and/or gaming machine can remain in continual communication with the gaming machine while the gaming session exits. This may be enabled with voice, e-mail or text messaging (SMS) or a mix of all between the mobile device and the backend server/gaming machine. A more sophisticated phone capable of receiving program logic (such as Java code), could also receive such code from the server or gaming machine enabling further modes of interaction.

By performing the method of FIGS. 8 and 9, the player achieves control over the gaming machine, and can maintain this control for some period of time as the player moves from location to location, for instance, to more comfortable positions in a lounge or restaurant.

In FIGS. 6 and 7, additional services may be provided or hosted by central control apparatus 640 alone or in cooperation with help desk 645. Such additional services are made more accessible to the player by virtue of the communications path established between the player’s mobile phone and the gaming machine network, including central control server 630. These services can be made available at various stages of the methods described herein with respect to FIGS. 8, 9, 10 and 11. The services can include management of additional venue functions such as drink service, room reservation, and the like. For example, the mobile device can display a menu and provide order validation. Additionally, a call forwarding service from the mobile device to a specific venue service can be enabled. The central service provider 625 can provide many services to the player through mobile device 605 such as bookings, car rentals and the like. These services may be facilitated by the use of ticket printing devices to provide printed receipts. In addition, as a benefit to the casino, the communications channel to the player’s mobile device can be used to send advertisements of various products or gaming machines. Advertisements can be downloaded from various sources to the mobile device. Also, pictures, movies or music may be provided from the central or venue backend server to the mobile device.

Many potential conveniences are possible with a connection between the mobile device and gaming machine. In a further example, the player may call the specified access number of the central services provider 625, enter the security code, and then receive play instructions, pay table information, possible feature outcomes or even talk to a live ‘game vLink’ staff at help desk 645 and have questions answered.

Also, many venues span huge spaces, with thousands of machines on offer. Although best efforts in terms of floor planning have been practiced, to a short term or first time visitor, the navigation from a service (such as a bar or conveniences) can be a daunting prospect. Using GPS technology, wireless triangulation techniques, or a mix of both, the player (using the known position of the gaming machine) is able to navigate back and forth interactively. This aspect may also be used by the venue if for instance the player wishes to locate something in particular, such as a gaming device, a show room or the like. They can contact the venue staff that can download information to the player’s mobile device, possibly interacting with the player by voice or text messages (or a combination) until the player achieves the desired result. Visual depictions of the gaming device, venue locations and the like may be sent to so enabled mobile devices.

In one embodiment, in which an initialization procedure is performed as described below with respect to FIG. 11, it is contemplated that the player can start an account with the central provider, thus facilitating further contact with the player for potential advertisers and/or promotional aspects. This account may be initiated at the venue or using traditional means (internet enrolment etc.)

In FIG. 9, in one embodiment, following step 970, the gaming machine is effectively locked by the mobile device. Game play is disabled on the machine until the player takes some further action. In this way, the player can leave and return when ready to resume game play, without having to cash out or otherwise terminate a game play session at the machine. In one embodiment, a locking procedure is performed, as described with respect to FIG. 10. Following step 965 or 970 of FIG. 9, the backend server sends the gaming machine various codes, such as lock commands, in step 1005. Then, in step 1010, the action of locking the gaming machine is visually acknowledged on a display of the gaming machine. Following step 1010, in step 1015, the gaming machine is secured until some further action is taken.

The "securing" and "locking" of gaming machine 610, as described above, is intended to include the holding of a game play session on behalf of the player, until that game play session can be resumed at some future time, directed by the player to be terminated, or a timeout condition is reached. In some embodiments, securing the gaming machine 610 refers to suspension of game play on that machine by any player. In an alternative embodiment, the securing of the gaming machine refers to initiating a bonus mode on the machine or requesting services from central services provider system 625, rather than suspending game play on that machine.

When the gaming session is in a remote game play state, credits, meter information and other game history data is stored in a suitable storage medium, such as a RAM at the gaming machine or a remote device until play resumes. In another embodiment, when the gaming machine enters a remote game play state, credits, meters, game history data, and any other player information is automatically transferred to a player tracking server or other remote device for storage in the player's account. Such information can be retrieved by the gaming machine if and when game play resumes on the machine.

Figure 10:
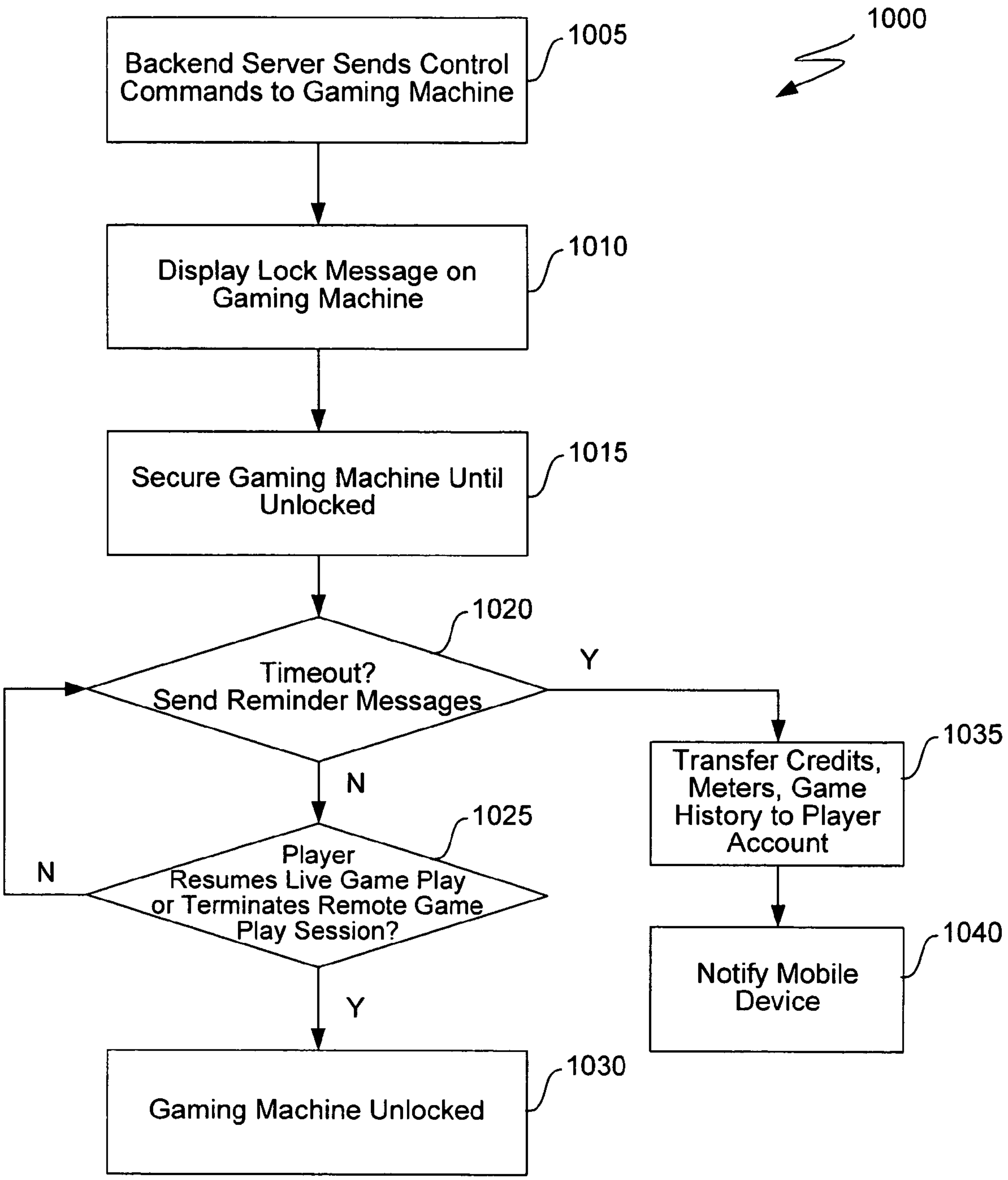
FIG. 10 shows a flow diagram of a method for securing a gaming machine, performed in accordance with one embodiment of the present invention.

In FIG. 10, following step 1015, the gaming machine is preferably secured until it is unlocked by the occurrence of an event. One of these events is a timeout, as shown in 1020. That is, when the gaming machine has been secured for a predetermined period of time, and the player has not returned, resumed the live game play session, or otherwise terminated the session, in step 1025, the master gaming controller on the gaming machine can automatically terminate the remote game play session in step 1030. This automated termination of remote game play may be desirable in situations when the player has turned off the mobile device or is otherwise unreachable. Following a timeout, any credit, meters, and other game play or player data is transferred to a player's account in step 1035, as described above. Then, in step 1040, a text or voice message can be sent to the player's mobile device informing the player of the timeout and transfer of game data. Those skilled in the art should appreciate that, following termination of the remote game play state by the player in step 1025, the player can cash out at the machine or request transfer of credits back to the player's account, and a receipt can be printed. Then the gaming machine is unlocked in step 1030 to be played by other players in the casino The backend server or central control server may send messages to the player's mobile device under various conditions or circumstances as desired. During a remote gaming session, the player may be sent a reminder message indicating they have a locked machine with say $100 credit remaining on the meters. Also, a message indicating the timeout period may be sent to the mobile device to warn the player of this pending action. Additionally, the player may contact venue management and have the backend server remove the credits and place these into a player account for latter redemption. The player may be asked by the staff to free the machine, have the credit transferred to a holding account and then at a later time the player may return to the machine and have the credits returned for play.

Figure 11:
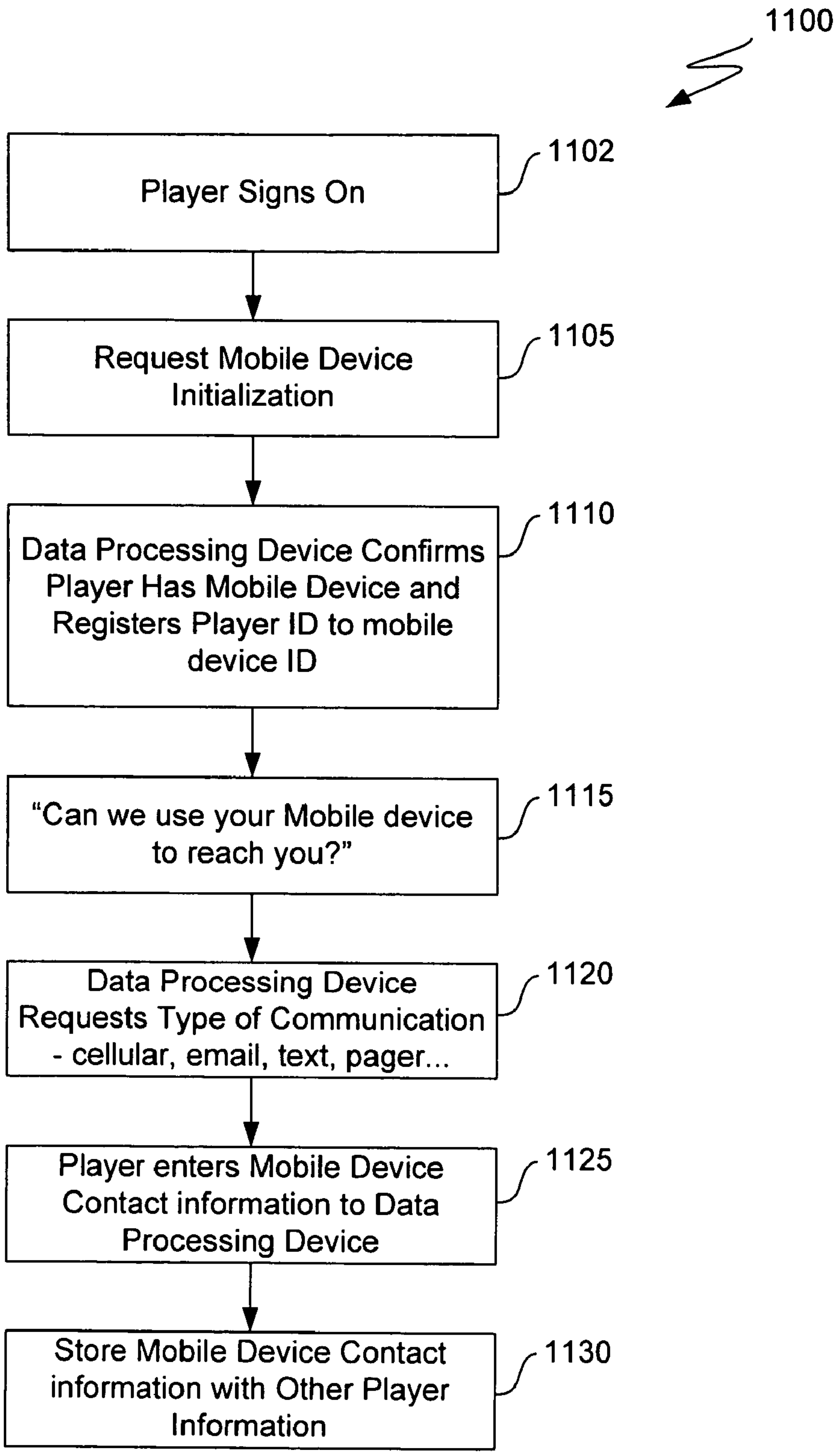
FIG. 11 shows a flow diagram of an initialization method for registering a mobile device with a gaming machine, performed in accordance with one embodiment of the present invention.

FIG. 11 shows an initialization method for registering a mobile device with a gaming machine, performed in accordance with one embodiment of the present invention. In one embodiment, the method 1100 described with reference to FIG. 11 is performed in the context of the method 800 described above with respect to FIGS. 8 and 9. In one embodiment, the method 1100 is performed as an initialization operation before method 800 is initiated. In another implementation, the method 1100 is implemented as one or more steps of during method 800, for instance, between steps 805 and 810, described above.

In FIG. 11, the method begins in step 1102, in which the player registers for game play at the gaming machine 610, kiosk 670, server, or other data processing apparatus configured to interact with the player. The player or a casino service representative may enter player identification information such as a name, an address and biometric information using an input mechanism located on the gaming machine, located on a hand-held wireless device or combinations thereof. In one embodiment of the present invention, the player may enter loyalty program registration information for a "point of play" registration using the mobile device. For instance, as explained above with respect to FIG. 5, the player tracking unit or gaming machine may contain a cellular interface for communicating directly with a player's cell phone. Information stored on the cell phone such as the cell phone number and the owner of the cell phone may be downloaded to the player tracking unit as a means of identifying the player. The cell phone may also be used as an interface to enter additional gaming information required to perform a point of play registration. In addition, after registration, an individual loyalty program registration phone number may be provided to the player. The player may store loyalty program registration phone number on their cell phone. Later, the player may use their cell phone to implement a loyalty program session on a gaming machine by dialing their loyalty program registration number. After establishing a loyalty program session using their cell phone, the player may also use their cell phone to access loyalty program information such as a loyalty program account balance. Thus, the cell phone may be used as a loyalty program instrument.

In FIGS. 1 and 2, after a player has inserted her or his player tracking card into the card reader 24, the player tracking unit 220 may command the touch screen display 210 to display the game player's name on the touch screen display 210 and also, may optionally display a message requesting the game player to validate their identity by entering an identification code using a game service interface with an alpha-numeric key pad displayed on touch screen display 210. The player may use their finger, a stylus or combinations thereof to enter their identification information using the touch screen sensor. Once the game player's identity has been validated, the player tracking information is relayed to a player tracking server which, in one embodiment, is implemented at central control server 630. Typically, the player tracking server stores player tracking account records including the number of player tracking points previously accumulated by the player. These records can be combined or associated with other player information described above in central storage 665.

In FIG. 11, in step 1102, after the player has entered the required information using the game service interface, the player may touch a register button and a registration request message is sent to the player tracking service. The registration request message contains at least the identification information entered by the player and identification information from the loyalty point instrument used in the registration process such as a serial number recorded from the magnetic striped card or other identification information recorded on the loyalty point instrument. The registration request message may be generated by a logic device located in the player tracking unit or in the gaming machine such as the master gaming controller. After receiving a confirmation of the registration from the player tracking server, any additional game play on the gaming machine by the player may be recorded on the gaming machine and sent to the player tracking server as part of a player tracking session. In one embodiment, the gaming machine may issue a printed receipt to the player to confirm the registration process.

In one embodiment, the player may also enter registration information on a touch screen display located on a hand-held wireless device carried by the player and obtain card information from a card reader attached to the hand-held device. The hand-held wireless device may communicate with a player tracking unit using a wireless communication standard such as Bluetooth. After entering the required information, a registration request message may be sent through a wire interface or a wireless interface on the gaming machine to the player tracking server or directly to the player tracking server from the mobile device.

The gaming machine preferably receives a registration reply from the player tracking server and determines if the registration has been confirmed from the registration reply message. When the registration has not been confirmed, a message may be displayed to the player indicating the registration request was denied with a reason for the denial. For instance, the registration may denied because the player is already registered for the player tracking program. When the registration has been confirmed by the player tracking server, a confirmation message may be displayed to the player and a player tracking session may be initiated on the gaming machine.

In FIG. 11, in step 1105, communications are initiated to register the mobile device 605 for use with one or more gaming machines in the network. Prior to enabling the network connection for the mobile device registration, a person or a system program may determine the player is eligible. For instance, eligibility to perform mobile device registration may be based upon a player's value to a casino such as a status in a player tracking club. When authentication is required, the information is loaded from the system (could be a smart-card reader on the gaming machine) or a message appears on the gaming machine instructing the customer to provide information. For example, the gaming machines could have a fingerprint sensor located on the front panel or another biometric device. When required, the gaming machine could instruct the customer that it needs a fingerprint image or other biometric information before the customer may perform mobile device registration. Information obtained through biometric sensors located on the gaming machine may be compared with information contained in a customer's biometric file. In some embodiments, the biometric information file may be downloaded to the gaming machine from a remote server and the biometric comparison may be performed on the gaming machine, the gaming machine may send biometric information to a remote server where the biometric comparison is performed, or combinations thereof.

In steps 1110 and 1115, responsive to a player's selection of the initialization process, the player ID information is associated with mobile device information, and the data processing device, such as gaming machine 610 in FIG. 2, generates and displays on a display a confirmation prompt such as, "Do you have a mobile device that we can use to reach you?" In step 1120, in one embodiment, when the player inputs a selection to the data processing device to confirm, in one example, the data processing device requests the player to specify the preferred method for communications (e.g., phone call, SMS text message, e-mail).

In FIG. 11, in step 1125, in one embodiment, the player supplies mobile device contact information for contacting the mobile device to the kiosk, a gaming machine, or other data processing device to receive the information. For example, when the mobile device is a cellular phone, the contact information can simply be the phone number. In one embodiment, the player manually enters the information on a keypad coupled to the data processing device. In another embodiment, the mobile device communicates the information directly to the gaming machine over a wireless connection such as Bluetooth. Those skilled in the art will understand that such wireless communication can be as automated as desired for the particular implementation.

In FIG. 11, in step 1130, the mobile device contact information is stored and associated with the name of the player holding the mobile phone, and possibly additional identification information used to identify the player, in a suitable storage medium. For example, the mobile device contact information can be stored with the player's name in the central control database coupled to central control server 630, described above. In one implementation, for security purposes, a timeout period is associated with the stored contact information, so that the stored information is automatically deleted by the data processing device when the stored contact information is not accessed on the database for registration.

Those skilled in the art should appreciate that various steps of method 1100 can be performed in conjunction with method 800 of FIGS. 8 and 9. For example, following step 805 of FIG. 8, the method 1100 can be performed, beginning with step 1105. Following step 1130, the method continues with step 810, in which the central control server 630 number is displayed on the gaming machine.

In FIG. 11, the method 1100 can be performed in various alternative ways. For example, an employee of the gaming venue operator may register players at a specific location set up for this purpose (e.g. at the concierge desk), or may "roam" the floor to perform this service wherever the player is located, using a suitable wireless hand-held device. Alternatively, the player may register him or herself over the Internet before entering the casino, at a kiosk established for registration at the casino, or at gaming units adapted to permit registration to occur.

Embodiments of the present invention provide for various payment schemes for the placement of phone calls and sending of other communications messages from the mobile device to the various servers over the mobile network 655 and public phone system 650. In one implementation, a gaming establishment such as a casino implementing methods and apparatus of the present invention enters into a business contract with one or more of the communications networks 650 and 655 so that costs associated with the call are deducted from player credits on the gaming device. In another implementation, the call is charged to a player account maintained, for instance, by the central control server 630. In yet another implementation, the call is paid for by the gaming establishment, and provided to the player as a free service. This implementation may be desirable for certain players considered by the casino to be "high-rollers." In some implementations, players can use the infrastructure for communications with other players local to the gaming venue or at another gaming venue.

Unique IDs can be used in various stages of communication according to embodiments of the present invention. Messages sent between the mobile device, gaming machine, backend server, central control server can include one or more of the following to ensure security and provide a transaction audit trail: 1) Gaming Machine ID, 2) Venue (Gaming Establishment) ID, 3) Venue Backend Server ID, 4) Venue Communication Channel Number, 5) Player mobile phone number, and 6) Unique Central Server transaction number. In one embodiment, this information is stored on the central control server 630 or central control database. The central control server 630 also stores code executable on a processor to generate security codes such as unique transaction IDs which can be encrypted as desired for the particular implementation. A one way function may further provide a unique transaction ID using all of this information. The encrypted number may then be passed back to the venue for association with a unique ID number used by the player to associate with the gaming machine, as described above. In an alternative embodiment, the central control server 630 provides this encryption function, depending on how the systems integrate.

In some implementations, security codes such as unique transaction IDs are rather long sequences—prone to typing errors and a source of frustration for the user. Accordingly, in one embodiment, either the venue backend server 620 or central control server 630 maintains a re-usable bank of unique numbers which are associated with the encrypted or one way function number.

Also of note, it is desirable in some embodiments that the encrypted number contains sufficient data to retrace transactions using that number. In one embodiment, the size of the number can be a function of the expected number of persistent transactions over a defined period. Public Key Encryption is envisaged as one method of passing the secure data between respective devices in the system, including the gaming machine. Also, those skilled in the art should not that, aside from the information passed between the various devices as described above, further information may be provided such as time, GPS data, further venue data, and player account information.

In some instances, gaming machines supporting mobile device registration may be located in a high-roller area (e.g., very valued customers). The wireless game players may be enabled by an attendant or may automatically be enabled when the casino customer inserts their player-tracking card into the gaming machine (special customer). As with the gaming machines located on the casino floor, the player-tracking system or some other remote gaming device may download the customer's biometric file to the gaming machine or the gaming machines could have a fingerprint sensor located on the front panel. When required, the gaming machine may instruct the customer that it needs a fingerprint image before the customer use the methods and apparatus of embodiments of the invention.

In some embodiments, authentication and verification of the player is performed. For example, to enforce age restrictions imposed by a jurisdiction, the user may be verified and authenticated. The gaming machine may have a biometric sensor (not shown) such as a fingerprint sensor. As part of the authentication process, the player may be asked to place their finger on the sensor located on located on the gaming machine. The fingerprint image is sent back to the controller in the backend server or central control server for comparison. As another example, the gaming machine may include a smart-card reader that reads biometric smart cards (cards having a built-in fingerprint sensor). The smart card has all the personal information of the casino guest. Thus, the authentication could occur directly at the gaming machine. A description of a finger print reader as an identification device is provided in U.S. Pat. No. 6,488,585, by Wells, et al., entitled "Gaming Device Identification Method and Apparatus," which is incorporated herein by reference in its entirety and for all purposes. Other types of verification methods such as a PIN number or a password may be used separately or in combination with biometric identification methods. Other biometric identification methods that may be used with the present invention including but not limited to feature identification using a camera, retinal pattern identification using a retinal scanner, voice pattern identification input using a microphone and hand-writing recognition using a hand writing input pad.

In one embodiment, for additional security, the mobile device has an encrypted serial number (code), which is used to verify and authenticate the mobile device. In addition, the mobile device may have a GPS (Global Positioning System) device to verify location of the device. Position verification may be used to ensure the mobile device is used in legal gaming areas of the casino and to track lost or stolen devices. When the gaming machine detects that the mobile device is in a restricted area, it may discontinue communications with the mobile device. Other security features may be used on the mobile device.

In one embodiment of the present invention, after the gaming machine is locked, or otherwise secured for the player holding the mobile device, the input mechanisms, such as the touch screen and the input buttons built into the gaming machine are deactivated. The display on the gaming machine may display a "reserved" or "out of order" message, to indicate the gaming machine is unavailable for game play. In one embodiment, after the passing of a predetermined period of time without player interaction When a player does not wish to reserve the gaming machine anymore, the player can terminate the secured session by returning to the gaming machine and entering player identification information, the security code, or some other suitable information to identify the player. For instance, after roaming with the gaming environment floor, the customer may return to the gaming machine and wish to resume play on the main display of the gaming machine. In this case, the customer may depress a "return" button on the gaming machine and after a verification cycle the player can begin playing at the gaming machine again. Also, the gaming machine may automatically terminate its secured or reserved status and reactivate itself after a period of inactivity. In this case, the gaming machine can transfer the player's credits and other metering information, from a suitable storage medium on the gaming machine to an accounting service implemented on a server, such as central control server 630. This way, the player can later access his current account balance, e.g. to cash out, through a kiosk or from a cashier at the casino. In an alternative embodiment, the credits are transferred to the player account at some point during the method 800, in some instances, responsive to the player selection of securing the gaming machine with the mobile device. Also, the player has the option of cashing out before leaving the gaming machine.

For dispute resolution, the game history of the remote gaming session is desirably stored in memory at the gaming machine, and sent to the central control server 630 or a separate game history recording device for storage in a suitable storage medium. In this way, game history information will be available to resolve disputes when the player believes not all of the credits were transferred, or otherwise disputes past winnings. That is, casino personnel can access this information from the storage medium on the network rather than attempting to recall the information from the gaming machine after other game play sessions have occurred at the gaming machine.

When the player registers with the gaming machine, or at least participates in the initial registration process of FIG. 11, methods performed in accordance with embodiments of the present invention can further include enabling and sending entertainment content to the mobile device, where the entertainment content is selected from the group consisting of an advertisement, news, stock quotes, electronic mail, a web page, a message service, a locator service or a hotel/casino service, a movie, a musical selection, a casino promotion, a broadcast event, a player tracking service, a drink menu and a snack menu. Other types of casino, hotel, or gaming environment services can be enabled by registering the mobile device with a gaming machine, using techniques described herein.

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Although the foregoing invention has been described in some detail for purposes of clarity of understanding, it will be apparent that certain changes and modifications may be practiced within the scope of the appended claims.

What is claimed is:

1. A method of securing a gaming machine for a player of the gaming machine using a mobile device associated with the player, the method comprising:

initiating a game play session;

receiving a player input at an interface of the gaming machine, the player input requesting securing of the gaming machine for the player;

responsive to the player input, retrieving an access code and a security code from a storage medium at the gaming machine, the access code defining an access point of a communications system, the security code specific to the game play session for the player at the gaming machine;

displaying on a display device the retrieved access code and security code at the gaming machine for the player;

receiving, at the gaming machine, a confirmation message from a server indicating: (1) access of the communications system by the mobile device using the access code responsive to the player inputting the access code to the mobile device, and (2) receipt of the security code from the mobile device responsive to the player inputting the security code to the mobile device;

responsive to receiving the confirmation message at the gaming machine, securing the gaming machine in the game play session so that the gaming machine enters a locked state in which game play at the gaming machine is disabled; and releasing the gaming machine from the locked state responsive to a releasing event, wherein the gaming machine returns to the game play session.

2. The method of claim 1, further comprising:

enabling a fund transfer operation using the mobile device.

3. The method of claim 1, wherein retrieving the security code includes:

sending a request message to a server for the security code; and receiving the security code.

4. The method of claim 1, wherein the access code is a phone number of a server in communication with the communications system.

5. The method of claim 1, wherein securing the gaming machine includes transferring credits associated with the player to a player account.

6. The method of claim 1, wherein the gaming machine interface is a wireless interface.

7. The method of claim 1, wherein securing the gaming machine includes defining a timeout period for the locked state.

8. The method of claim 1, further comprising:

providing for the player a list of a plurality of lock modes, including sending the list to the mobile device for display on the mobile device.

9. The method of claim 1, further comprising:

receiving an indication of one of a plurality of lock modes from the mobile device, the locked state defined according to the indicated lock mode.

10. The method of claim 1, wherein the releasing event is selected from the group consisting of a timeout, release of remote game play by the player, and instruction to terminate the locked state.

11. The method of claim 1, wherein securing the gaming machine includes entering a promotional mode.

12. The method of claim 1, wherein the mobile device is selected from a cell phone, a PDA, and a laptop computer.

13. A gaming machine for providing a game of chance for a player of the gaming machine, the player having an associated mobile device, the gaming machine comprising:

a player interface coupled to receive a player input requesting securing of the gaming machine for the player;

a gaming controller including a processor configured to:

i) initiate a game play session, ii) retrieve an access code and a security code from a storage medium at the gaming machine, the access code defining an access point of a communications system, the security code specific to the game play session for the player at the gaming machine, and iii) display on a display device the retrieved access code and security code at the gaming machine for the player; and a network interface, wherein the network interface is coupled to receive, at the gaming machine, a confirmation message from a server indicating: (1) access of the communications system by the mobile device using the access code responsive to the player inputting the access code to the mobile device, and (2) receipt of the security code from the mobile device responsive to the player inputting the security code to the mobile device;

wherein the gaming controller is further configured to:

iv) responsive to receiving the confirmation message at the gaming machine, secure the gaming machine in the game play session so that the gaming machine enters a locked state in which game play at the gaming machine is disabled, and v) release the gaming machine from the locked state responsive to a releasing event, wherein the gaming machine returns to the game play session.

14. The gaming machine of claim 13, wherein the gaming controller is further configured to:

enable a fund transfer operation using the mobile device.

15. The gaming machine of claim 13, wherein retrieving the security code includes:

sending a request message to a server for the security code; and receiving the security code.

16. The gaming machine of claim 13, wherein the access code is a phone number of a server in communication with the communications system.

17. The gaming machine of claim 13, wherein securing the gaming machine includes transferring credits associated with the player to a player account.

18. The gaming machine of claim 13, wherein securing the gaming machine includes defining a timeout period for the locked state.

19. The gaming machine of claim 13, wherein the releasing event is selected from the group consisting of a timeout, releasing of remote game play by the player, and instruction to terminate the locked state.

20. The gaming machine of claim 13, wherein securing the gaming machine includes entering a promotional mode.

21. The gaming machine of claim 13, wherein the mobile device is selected from a cell phone, a PDA, and a laptop computer.

22. A method of securing a gaming machine for a player of the gaming machine using a mobile device associated with the player, the method comprising:

initiating a game play session;

receiving a player input at an interface of the gaming machine, the player input requesting securing of the gaming machine for the player;

responsive to the player input, retrieving an access code and a security code from a storage medium at the gaming machine, the access code defining an access point of a communications system, the security code specific to the game play session for the player at the gaming machine;

displaying on a display device the retrieved access code and security code at the gaming machine for the player;

receiving, at the gaming machine, a confirmation message from a server indicating: (1) access of the communications system by the mobile device using the access code responsive to the player inputting the access code to the mobile device, and (2) receipt of the security code from the mobile device responsive to the player inputting the security code to the mobile device;

responsive to receiving the confirmation message at the gaming machine, securing the gaming machine at a point in the game play session so that the gaming machine enters a locked state in which game play at the gaming machine is disabled; and releasing the gaming machine from the locked state responsive to a releasing event, wherein the gaming machine returns to the point in the game play session.

* * * * *